US011552813B2

(12) United States Patent
Barzilay et al.

(10) Patent No.: US 11,552,813 B2
(45) Date of Patent: Jan. 10, 2023

(54) MODIFYING DIRECT MESSAGE COMMUNICATION MEMBERSHIP

(71) Applicant: Slack Technologies, Inc., San Francisco, CA (US)

(72) Inventors: Ittai Sean Barzilay, San Francisco, CA (US); Elizabeth Clemenson, San Francisco, CA (US); Pedro Carmo, Brooklyn, NY (US); Andrew S. Morrison, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/003,264

(22) Filed: Aug. 26, 2020

(65) Prior Publication Data

US 2022/0070013 A1 Mar. 3, 2022

(51) Int. Cl.
*G06F 15/16* (2006.01)
*H04L 12/18* (2006.01)
*G06F 3/0482* (2013.01)

(52) U.S. Cl.
CPC ...... *H04L 12/1822* (2013.01); *H04L 12/1827* (2013.01); *G06F 3/0482* (2013.01)

(58) Field of Classification Search
CPC . H04L 12/1822; H04L 12/1827; H04L 51/04; H04L 51/16; H04L 51/32; H04L 51/12; H04L 51/18; H04L 51/36
USPC ........................................ 709/204–207, 227
See application file for complete search history.

(56) References Cited

U.S. PATENT DOCUMENTS

| | | | |
|---|---|---|---|
| 10,021,059 B1 * | 7/2018 | Rao | H04L 63/102 |
| 10,805,247 B1 * | 10/2020 | Cohen | H04L 51/36 |
| 2007/0288560 A1 * | 12/2007 | Bou-Ghannam | G06Q 10/107 |
| | | | 709/204 |
| 2008/0080679 A1 * | 4/2008 | Fernandez | H04L 51/14 |
| | | | 379/88.17 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Farzana B Huq
(74) *Attorney, Agent, or Firm* — Lee & Hayes, P.C.

(57) ABSTRACT

Modifying direct message (DM) communication membership is described. A communication platform can receive, in association with a DM communication associated with a first group of users and from a user computing device of a user of the first group of users, a first request to modify the first group of users. The communication platform can send, to the user computing device, a second request to designate whether to include context data associated with the DM communication in a new channel. Based at least partly on receiving an indication to include at least a portion of the context data associated with the DM communication in the new channel, the communication platform can generate the new channel, wherein the new channel is associated with a second group of users different than the first group of users, and at least the portion of the context data is associated with the new channel.

18 Claims, 7 Drawing Sheets

(56) References Cited

U.S. PATENT DOCUMENTS

| | | | | |
|---|---|---|---|---|
| 2013/0246525 | A1* | 9/2013 | Patil | H04L 12/1827 709/204 |
| 2016/0284031 | A1* | 9/2016 | Quon | G06Q 30/01 |
| 2017/0195374 | A1* | 7/2017 | Vu | H04W 4/08 |
| 2017/0323086 | A1* | 11/2017 | Lopez-Uricoechea | H04L 63/104 |
| 2018/0287982 | A1 | 10/2018 | Draeger et al. | |
| 2019/0068390 | A1* | 2/2019 | Gross | H04L 12/1827 |
| 2021/0044551 | A1* | 2/2021 | Cohen | H04L 51/12 |
| 2021/0117213 | A1* | 4/2021 | Chen | G06F 9/453 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

MODIFYING DIRECT MESSAGE COMMUNICATION MEMBERSHIP

TECHNICAL FIELD

A communication platform can leverage a network-based computing system to enable users to exchange data. In an example, users of the communication platform can communicate with other users via direct message (DM) communications. In some examples, a DM communication can be a virtual space and/or data route used for exchanging data between and among systems and devices associated with two or more users of a communication platform. For example, a DM communication may be established between and among two or more user computing devices, allowing the two or more user computing devices to communicate and share data between and among each other over one or more networks (e.g., via the communication platform).

In addition to DM communications, users of the communication platform can communicate with other users via communication channels, which can be referred to herein as "channels." A channel can be a virtual space and/or data route used for exchanging data between and among systems and devices associated with the communication platform. For example, a channel may be established between and among various user computing devices, allowing the user computing devices to communicate and share data between and among each other over one or more networks (e.g., via the communication platform).

BRIEF DESCRIPTION OF THE DRAWINGS

The detailed description is described with reference to the accompanying figures. In the figures, the left-most digit of a reference number identifies the figure in which the reference number first appears. The use of the same reference number in different figures indicates similar or identical components or features. The figures are not drawn to scale.

DETAILED DESCRIPTION

Figure 1:
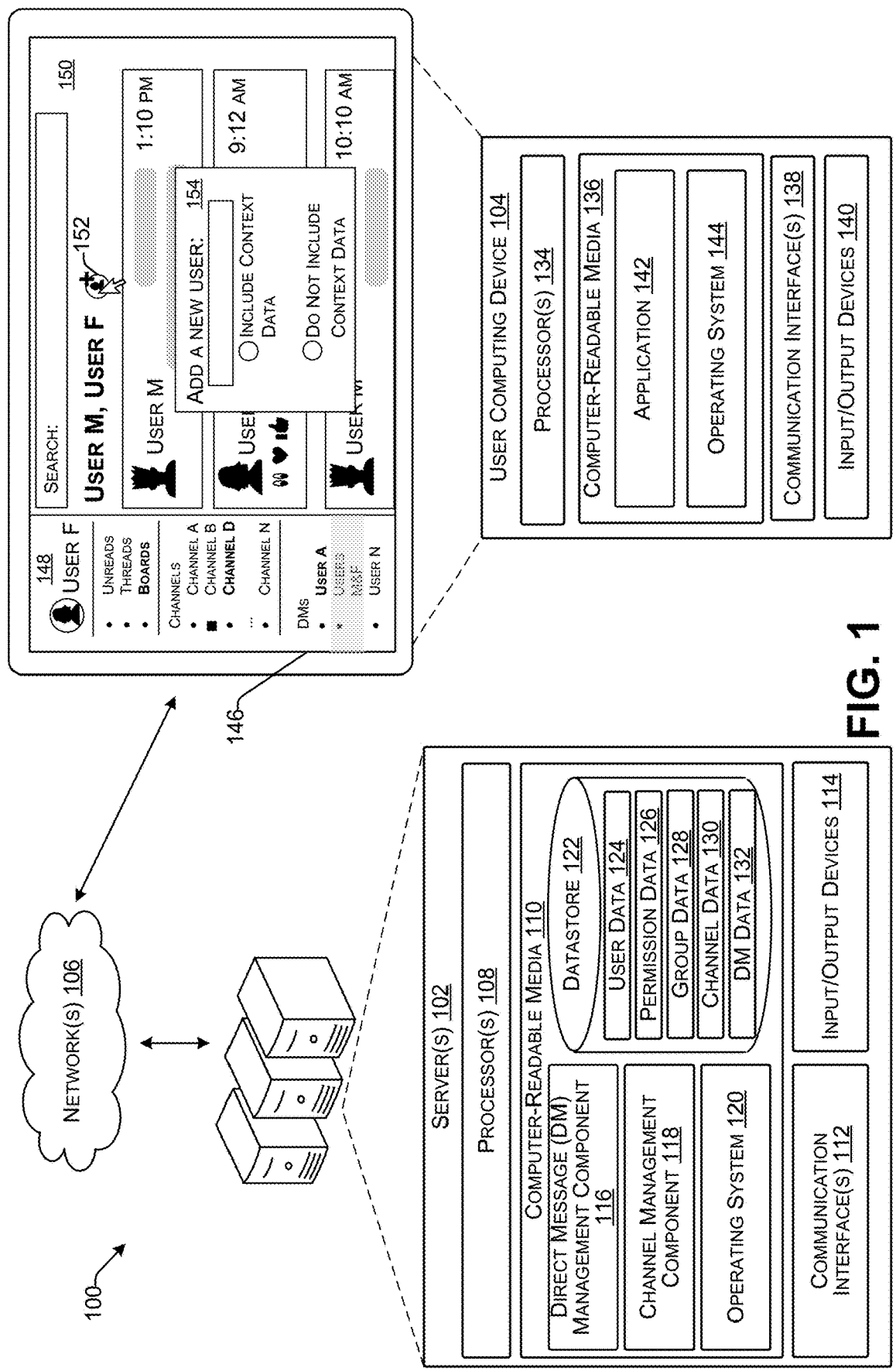
FIG. 1 illustrates an example environment for performing techniques described herein.

A communication platform can offer different types of virtual spaces for users of the communication platform to communicate between and among each other. In some examples, two or more users can communicate via a direct message (DM) communication. In some examples, two or more users can communicate via a communication channel, which can be referred to herein as a "channel." In at least one example, DM communications can be associated with different features and/or permissions than channels. In at least one example, users associated with a DM communication, which can be called "members" of the DM communication, may not be permitted to add other users to the DM communication, remove other users from the DM communication, and/or leave the DM communication. In contrast, in at least one example, users associated with a channel, which can be called "members" of the channel, may be permitted to add other users to the channel, remove other users from the channel, and/or leave the channel. In some examples, a DM communication between two or more users can evolve such that the two or more users desire to bring another user into the DM communication. In some examples, if there are more than two users in a DM communication and the DM communication evolves, two or more of the users may want to remove another user from the DM communication. As described above, in at least one example, users associated with DM communications may not be permitted to modify membership of DM communications. Techniques described herein are directed to "adding" members to or "removing" members from a DM communication by "converting" the DM communication into a new channel. That is, techniques described herein are directed to generating a new channel based at least in part on a DM communication, thereby enabling users to be added to a DM communication as new members and/or removed as members of a DM communication.

As described above, conversations often grow and necessitate the addition and/or removal of other users to/from the conversation. In the case of email communications, adding users to an email communication is easy—a user can add an email address as a recipient and by "replying all," a newly added user can be included in all future email communications. Further, by adding the user as a recipient to an email, the user is able to access previous emails associated with the same conversation to understand the conversation. If a user is to be removed, a sender can simply remove the user as a recipient, and the user will not receive future email communications associated with the conversation. In some examples, users associated with the communication platform described herein can be added and/or removed from virtual spaces offered by the communication platform. For example, as described above, in at least one example, users can be added to and/or removed from channels (pending permissions associated with such channels). However, some virtual spaces (e.g., DM communications) may be associated with limitations on whether users can be added (or removed). In some examples, a workaround can cause the generation of a new DM communication with proper membership, but the generation of a new DM communication with proper membership may have limitations on whether messages or other data associated with the previous DM communication is associated with the new DM communication. As such, newly added users may not be able to see the conversation that prompted the addition of the user to the new DM communication. Or, if a user is removed, users remaining part of the conversation may desire to access messages or other data associated with the previous DM communication that may not otherwise be available with current techniques.

Techniques described herein are directed to streamlining modifications of membership to DM communications. For instance, in at least one example, techniques described herein are directed to the addition of users to a conversation to enable users to expand the audience of their conversation efficiently and with minimal user interaction. In at least one example, a user associated with a DM communication can interact with a user interface associated with the communication platform to request to add an additional user to the DM communication. In such an example, the communication platform (e.g., via computing device(s) associated therewith) can request the user to identify the additional user to be added and designate (i) whether to include context data from the DM communication in a new channel and/or (ii) an amount of context data from the DM communication to include in the new channel.

For the purpose of this discussion, "context data" can be data that is associated with the DM communication that is representative of previous communications between the users associated with the DM communication. In some examples, context data can include messages, files (e.g., documents, images, etc.), links, emojis, reactjis, calls, and/or the like that can be associated with the DM communication. In some examples, context data can be associated with a date stamp, time stamp, indication of a user who added a data item to the DM communication, or the like. In at least one example, the "context data" can comprise the conversational history associated with the DM communication.

In some examples, the user can designate (i) whether to include context data from the DM communication in a new channel and/or (ii) an amount of context data from the DM communication to include in the new channel, and based at least in part on receiving an indication of (i) whether to include context data from the DM communication in a new channel and/or (ii) an amount of context data from the DM communication to include in the new channel, the communication platform can generate a new channel that includes the users previously associated with the DM communication and the additional user. If the communication platform receives an indication to include context data, and/or an amount of context data to include, the communication platform can associate such context data with the new channel. As such, the newly added user can view context data to understand the conversation that prompted the addition of the newly added user to the conversation. The newly added user and users that were previously associated with the DM communication can exchange data and carry on the conversation via the newly created channel. The newly added user and the users that were previously associated with the DM communication can be "members" of the new channel.

As described above, techniques described herein enable users to add additional users to their conversations via a streamlined, efficient process that minimizes interaction required of the users. Techniques described herein therefore provide for a faster "conversion" process (i.e., "converting" a DM communication to a new communication channel). Furthermore, techniques described herein provide users with control on how much context data is shared with newly added users. This can enable users to share portion(s) of previous conversations without sharing all of their previous conversations (which may or may not be relevant to the newly added user), providing both privacy and security for users of the communication platform. As such, techniques described herein provide improvements to existing computing processes by streamlining the addition (or removal) of users from DM communications.

While techniques described above reference the addition of a user to an existing DM communication between two or more users, the same or similar techniques can apply to removing user(s) from an existing DM communication. That is, techniques described herein can streamline the modification of membership of DM communications as it pertains to adding or removing members from existing DM communications. Additional details and examples are described below with reference to FIGS. 1-7.

FIG. 1 illustrates an example environment 100 for performing techniques described herein. The example environment 100 can be associated with a communication platform that can leverage a network-based computing system to enable users of the communication platform to exchange data. In at least one example, the communication platform can be a channel-based communication platform, a message-based communication platform, and/or the like. In at least one example, the communication platform can be "group-based" such that the communication platform and associated systems, channels, DM communications, and/or other virtual spaces, messages, and/or the like have security (that can be defined by permissions) to limit access to defined groups of users. In some examples, such groups of users can be defined by identifiers, as described above, which can be associated with common access credentials, domains, or the like. In some examples, the communication platform can be a hub, offering secure and private virtual space(s) to enable users to chat, meet, call, collaborate, transfer files or other data, or otherwise communicate between or among each other.

In some examples, a group can be associated with an organization, which can be associated with an organization identifier. Users associated with the organization identifier can chat, meet, call, collaborate, transfer files or other data, or otherwise communicate between or among each other in a secure and private virtual space available via the communication platform. In some examples, users associated with a same organization can be associated with a same set of permissions, which can be associated with the organization. Users of different organizations can be associated with different permissions.

In some examples, a group can be associated with a workspace, associated with a workspace identifier. Users associated with the workspace identifier can chat, meet, call, collaborate, transfer files or other data, or otherwise communicate between or among each other in a secure and private virtual space available via the communication platform. In some examples, users associated with a same workspace can be associated with a same set of permissions, which can be associated with the workspace. In some examples, users associated with different workspaces, can be associated with different permissions.

In some examples, a group can be associated with multiple organizations and/or workspaces. In some examples, an organization can be associated with multiple workspaces.

In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., data, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media 110 can optionally include a DM management component 116, a channel management component 118, an operating system 120, and a datastore 122. The computer-readable media 110 can include additional or alternative functional components.

In at least one example, the DM management component 116 can manage DM communications. As described above, in at least one example, two or more users can communicate with one another via a DM communication. A DM communication can be a virtual space and/or data route used for exchanging data between and among two or more systems and devices associated with two or more users of the communication platform. For example, a DM communication may be established between and among two or more user computing devices, allowing the two or more user computing devices to communicate and share data between and among each other over the network(s) 106 (e.g., via the communication platform).

In at least one example, the DM management component 116 can establish a DM communication between and among various user computing devices, allowing the user computing devices to communicate and share data between and among each other. In at least one example, users associated with a DM communication can be "members" of the DM communication, as described above. In some examples, a DM communication can be between users associated with a same group (e.g., workspace, organization). In some examples, a DM communication can be between users associated with different groups (e.g., workspaces, organizations). That is, in some examples, a DM communication can be associated with a first user associated with a first workspace and/or organization and at least a second user associated with a second workspace and/or organization that can be different than the first workspace and/or organization. In some examples, users associated with a DM communication can be associated with the same permission(s) or different permission(s). In the case of different permission(s), a first user can be associated with one or more first permissions and a second user can be associated with one or more second permissions.

In at least one example, the DM management component 116 can manage DM communications and/or sharing of data via DM communications. For example, in at least one example, the DM management component 116 can receive a request to generate a DM communication. In some examples, the request can include one or more users to invite to join the DM communication, and/or permissions associated with the DM communication. In some examples, the user(s) can be associated with a same group as the requesting user or a different group. For example, in some examples, one or more of the user(s) can be associated with a different group such that the DM communication can be "externally" shared. In such an example, a user associated with a first organization (or the host organization) can invite a user associated with a second organization (or the invited organization) to join a DM communication. A resulting DM communication can be called a "shared DM communication" or an "externally shared DM communication."

DM communications can be associated with features, some of which can be determined by permissions. Such permissions can indicate whether members can leave a DM communication, whether additional users can be added to a DM communication, whether users can be removed from a DM communication, whether guest users can be added to a DM communication, whether external users (e.g., associated with a different workspace, different organization, etc.) can join a DM communication, whether DM communications are discoverable, where DM communications are discoverable (e.g., in a people search, DM browser, linked within a message, etc.), whether a DM communication can be renamed and/or associated with a topic, purpose, or other details, and/or the like. In at least one example, the permissions can indicate that users who are associated with a DM communication (i.e., "members") can access and/or otherwise interact with data associated with the DM communication and users who are not associated with a DM communication, may not access and/or otherwise interact with data associated with the DM communication. In some examples, a user may post files or images but another user without permission(s) (e.g., with different permission(s)) cannot. In some examples, the data retention of messages from users with certain permission(s) may be longer than users with different permission(s). In at least one example, users can be "added" or "removed" from a DM communication, via techniques described herein.

For example, in at least one example, a user associated with a DM communication can interact with a user interface presented via the user computing device 104 to request to add another user to the DM communication. For privacy and security purposes, the DM management component 116 may not be able to add the user to the DM communication (e.g., as defined by permissions associated with the DM communication). Instead, in at least one example, the DM management component 116, via the channel management component 118, may generate a new channel, wherein the members of the DM communication and the to-be-added user are members of the new channel. In such an example, the DM management component 116 can receive a request to add a user to a DM communication and can send a request back to the user computing device 104, prompting the user to identify the user(s) to be added and, in some examples, designate (i) whether to include context data from the DM communication in a (to be generated) new channel and/or (ii) an amount of context data from the DM communication to include in the new channel. Such a request (e.g., from the DM management component 116) can cause a user interface element to be presented via a user interface associated with the communication platform on a user computing device of the requesting user. Examples of such a user interface and user interface element are described below.

In some examples, the user can interact with the user interface and/or user interface element to provide identifier(s) associated with user(s) to be added (e.g., mentions, userID, email address, etc.) and, in some examples, designate (i) whether to include context data from the DM communication in a new channel and/or (ii) an amount of context data from the DM communication to include in the new channel. The user computing device 104 can send the identifier(s) and, in some examples, an indication of such designation(s) to the server(s) 102 and the DM management component 116 can receive such information. In at least one example, based at least in part on receiving the identifier(s) and, in some examples, an indication of (i) whether to include context data from the DM communication in a new channel and/or (ii) an amount of context data from the DM communication to include in the new channel, the DM management component 116 can cause a new channel to be generated (e.g., by the channel management component 118). In at least one example, the new channel can include the users previously associated with the DM communication and the newly added user(s) (e.g., as identified from the identifier(s) provided). If the DM management component 116 receives an indication to include context data, and/or an amount of context data to include, the DM management component 116 can cause such context data to be associated with the new channel. As such, the newly added user(s) can view context data to understand the conversation that prompted the addition of the newly added user(s) to the conversation. In at least one example, the newly added user(s) and the users that were previously associated with the DM communication can exchange data and carry on the conversation via the newly created channel. The newly added user(s) and the users that were previously associated with the DM communication can be "members" of the new channel.

In some examples, the new channel can be a private channel that may not be discoverable to other users of the communication platform. In some examples, the new channel can be a channel shared between two or more different organizations (e.g., if members of the channel are associated with different organizations). In some examples, the new channel can be associated with permission(s) that are different than the DM communication. That is, the new channel can be associated with permission(s) that designate how the member(s) of the new channel can interact with the new channel (subject to their own permission(s)). In some examples, members of the new channel can be associated with different permission(s).

Members can be removed from DM communications via a similar process as described above. For example, in at least one example, a user associated with a DM communication can interact with a user interface presented via the user computing device 104 to request to remove a user from the DM communication. For privacy and security purposes, the DM management component 116 may not be able to remove the user from the DM communication. Instead, in at least one example, the DM management component 116 may generate a new channel, via the channel management component 118, wherein members of the new channel comprise members that have not been removed and/or requested to be removed. In at least one example, the DM management component 116 can receive a request to remove a user from a DM communication and can send a request back to the user computing device 104, requesting the user to identify which user(s) to remove (e.g., by providing an identifier associated therewith) and, in some examples, designate (i) whether to include context data from the DM communication in a (to be generated) new channel and/or (ii) an amount of context data from the DM communication to include in the new channel.

In some examples, the user can interact with the user interface and/or user interface element to provide identifier(s) associated with user(s) to be removed (e.g., mentions, userID, email address, etc.) and, in some examples, designate (i) whether to include context data from the DM communication in a new channel and/or (ii) an amount of context data from the DM communication to include in the new channel. The user computing device 104 can send the identifier(s) and, in some examples, an indication of such designation(s) to the server(s) 102 and the DM management component 116 can receive such information. In at least one example, based at least in part on receiving the identifier(s) and, in some examples, an indication of (i) whether to include context data from the DM communication in a new channel and/or (ii) an amount of context data from the DM communication to include in the new channel, the DM management component 116 can cause a new channel to be generated (e.g., by the channel management component 118). In at least one example, the new channel can include the users previously associated with the DM communication, except for the user(s) that was/were removed (e.g., as determined by the identifier(s) received). If the DM management component 116 receives an indication to include context data, and/or an amount of context data to include, the DM management component 116 can cause such context data to be associated with the new channel. As such, the remaining members (e.g., the users who were not removed) can exchange data and carry on the conversation via the newly created channel.

In at least one example, the channel management component 118 can manage channels. As described above, in at least one example, the communication platform can be a channel-based messaging platform, that in some examples, can be usable by group(s) of users. As described above, each group can be associated with a group identifier (e.g., organization identifier, workspace identifier) and one or more user accounts can be mapped to, or otherwise associated with, the group identifier. User(s) corresponding to such user account(s) can be "members" of the group.

In at least one example, users of the communication platform can communicate with other users via channels. A channel can be a virtual space and/or data route used for exchanging data between and among systems and devices associated with the communication platform. In at least one example, the channel management component 118 can establish a channel between and among various user computing devices, allowing the user computing devices to communicate and share data between and among each other. In at least one example, users who subscribe to updates associated with a channel and/or have permission to view, share, and/or interact with data associated with a channel can be referred to as "members" of the channel. In at least one example, the channel management component 118 can manage channel communications and/or sharing of data via channels.

In some examples, a channel may be "public," which may allow any user within a group (e.g., associated with an organization identifier, associated with a workspace identifier, etc.) to join and participate in the data sharing through the channel. In at least one example, any full member of a public channel can view and/or interact with context data associated with the public channel (e.g., history), add and/or remove members, and/or otherwise interact with the public channel. Public channels can be discoverable for users associated with a same group or who otherwise have permission to join. In some examples, a channel may be "private," which may restrict data communications in the channel to certain users or users having particular roles (e.g., managers, administrators, etc.) and/or types (e.g., verified, etc.). In some examples, private channels may not be discoverable by users who are not members of the private channels and users who are not members of the private channels may not be permitted to view or interact with data associated therewith. In at least one example, users who are members of a channel—private or public—can add or remove members, so long as such users have permission to do so (e.g., as defined by channel permissions and/or individual user permissions).

In some examples, a channel may be "shared," which may allow users associated with two or more different groups (e.g., entities associated with two or more different organization and/or workspace identifiers) to join and participate in the data sharing through the channel. Shared channels may be public such that they are accessible to any user of either group, or they may be private such that they are restricted to access by certain users or users having particular roles and/or types.

In at least one example, the channel management component 118 can receive a request to generate a channel. In some examples, the request can include a name that is to be associated with the channel, one or more users to invite to join the channel, and/or permissions associated with the channel. In some examples, the user(s) can be associated with a same group as the requesting group or a different group. For example, in some examples, one or more of the user(s) can be associated with a different group such that the channel can be "externally" shared. As described above, in at least one example, a first organization (or the host organization) can invite a second organization (or the invited organization) to join a channel. A resulting channel can be called a "shared channel" or an "externally shared channel." In some examples, an administrator or other user associated with the first organization can invite new members in the first organization or the second organization via a mention, a profile view, an email, or generating a link from a user interface associated with the channel that enables users to be added to the channel.

In some examples, channels can be associated with features, some of which can be determined by permissions. Such permissions can indicate whether members can leave a channel, whether additional users can be added to a channel, whether users can be removed from a channel, whether guest users can be added to a channel, whether external users (e.g., associated with a different workspace, different organization, etc.) can join a channel, whether channels are discoverable, where channels are discoverable (e.g., in a people search, channel search, channel browser, linked within a message, etc.), whether a channel can be renamed and/or associated with a topic, purpose, or other details, and/or the like. In at least one example, the permissions can indicate that users who are associated with a channel (i.e., "members") can access and/or otherwise interact with data associated with the channel and users who are not associated with a channel, may not access and/or otherwise interact with data associated with the channel. In some examples, a user can preview data associated with a channel, but may not be able to interact with such data if the user is not associated with the channel.

In at least one example, the channel management component 118 can generate new channels based at least in part on instructions received from the DM management component 116, described above. Additional details are described below.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user computing device 104. The datastore 122 can comprise one or more databases, which can include user data 124, permission data 126, group data 128, channel data 130, and DM data 132. Additional or alternative data may be stored in the data store and/or one or more other data stores.

In at least one example, the user data 124 can store data associated with users of the communication platform. In at least one example, the user data 124 can store data in a user profile (which can also be referred to as a "user account"), which can store data associated with a user, including, but not limited to, one or more user identifiers associated with multiple, different organizations, groups, or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group in the group data 128. In some examples, permissions can indicate restrictions on individual groups, restrictions on channel(s) associated with individual groups, restrictions on DM(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 130. In some examples, permissions can indicate restrictions on individual channels, restrictions on user(s) associated with individual channels, and the like.

In some examples, the permission data 126 can store data associated with permissions of individual DM communications. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a DM communication can be mapped to, or otherwise associated with, data associated with the DM communication in the DM data 132. In some examples, permissions can indicate restrictions on individual DM communications, restrictions on user(s) associated with individual DM communications, and the like.

In at least one example, the group data 128 can store data associated with individual groups, which as described above, can be organizations, workspaces, or the like. As described above, the communication platform can be partitioned into groups associated with groups of users. In at least one example, a group identifier can be associated with a group that is registered, or otherwise associated with the communication platform. In at least one example, the group identifier can indicate a physical address in the group data 128 where data related to the corresponding group is stored. In at least one example, data associated with group permissions can be stored in association with the group identifier, data identifying users associated with the group can be stored in association with the group identifier, data associated with messages and/or other data associated with the group can be stored in association with the group identifier, data associated with channels associated with the group can be stored in association with the group identifier, and the like. In some examples, such data can be mapped to, or otherwise associated with, other types of data in the datastore 122 (e.g., the user data 124, the permission data 126, the channel data 130, DM data 132, etc.).

In at least one example, the channel data 130 can store data associated with individual channels. In at least one example, the channel management component 118 can establish a channel between and among various user computing devices, allowing the user computing devices to communicate and share data between and among each other. In at least one example, a channel identification may be assigned to a channel, which indicates the physical address in the channel data 130 where data related to that channel is stored. In at least one example, such a channel identification can be associated with a data structure associated with the corresponding channel.

In at least one example, the DM data 132 can store data associated with individual DM communications. In at least one example, the DM management component 116 can establish a DM communication between and among various user computing devices, allowing the user computing devices to communicate and share data between and among each other. In at least one example, a DM communication identification may be assigned to a DM communication, which indicates the physical address in the DM data 132 where data related to that DM communication is stored. In at least one example, such a DM communication identification can be associated with a data structure associated with the corresponding DM communication.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored. In some examples, a database shard can store data related to two or more groups (e.g., as in a shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored.

In some examples, a DM communication can be associated with a database shard within the datastore 122 that stores data related to a particular DM communication identification. For example, a database shard may store electronic communication data associated with the DM communication, which enables members associated with that DM communication to post data that can be accessible to other members associated with the same DM communication in real time or near-real time. In this example, a user, a group, and/or an organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 134, computer-readable media 136, one or more communication interfaces 138, and input/output devices 140.

In at least one example, each processor of the processor(s) 134 can be a single processing unit or multiple processing units, and can include single or multiple computing units or multiple processing cores. The processor(s) 134 can comprise any of the types of processors described above with reference to the processor(s) 108 and may be the same as or different than the processor(s) 108.

The computer-readable media 136 can comprise any of the types of computer-readable media 136 described above with reference to the computer-readable media 110 and may be the same as or different than the computer-readable media 110. Functional components stored in the computer-readable media can optionally include at least one application 142 and an operating system 144.

In at least one example, the application 142 can be a mobile application, a web application, or a desktop application, which can be provided by the communication platform or which can be an otherwise dedicated application. In some examples, individual user computing devices associated with the environment 100 can have an instance or versioned instance of the application 142, which can be downloaded from an application store, accessible via the Internet, or otherwise executable by the processor(s) 134 to perform operations as described herein. That is, the application 142 can be an access point, enabling the user computing device 104 to interact with the server(s) 102 to access and/or use communication services available via the communication platform. In at least one example, the application 142 can facilitate the exchange of data between and among various other user computing devices, for example via the server(s) 102. In at least one example, the application 142 can present user interfaces, as described herein. In at least one example, a user can interact with the user interfaces via touch input, keyboard input, mouse input, spoken input, or any other type of input. Techniques described herein as being performed by the application 142 can be performed and/or otherwise facilitated via other access points, such as web browsers or the like.

A non-limiting example of a user interface 146 is shown in FIG. 1. As illustrated in FIG. 1, the user interface 146 can present data associated with one or more DM messages, one or more channels and, in some examples, one or more groups. In some examples, the user interface 146 can include a first region 148, or pane, that includes indicator(s) (e.g., user interface element(s) or object(s)) representing data associated with the group(s), channel(s), DM message(s), etc. with which the user (e.g., account of the user) is associated. Additional details associated with the first region 148 and indicator(s) are described below with reference to FIG. 2.

In at least one example, the user interface 146 can include a second region 150, or pane, that can be associated with a data feed (or, "feed") indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the second region 150 can be associated with the same or different workspaces. That is, in some examples, the second region 150 can present data associated with the same or different workspaces via an integrated feed. In some examples, the data can be organized and/or is sortable by workspace, time (e.g., when associated data is posted or an associated operation is otherwise performed), type (e.g., of action), channel, DM communication, user, or the like. In some examples, such data can be associated with an indication of which user (e.g., member of the channel) posted the message and/or performed an action. In examples where the second region 150 presents data associated with multiple workspaces, at least some data can be associated with an indication of which workspace the data is associated with. Additional details associated with the user interface 146, and the second region 150, are described below with reference to FIG. 2.

In FIG. 1, the second region 150 is associated with a DM communication feed associated with a DM communication (e.g., the DM communication between Users M and F). In at least one example, the DM communication feed can indicate messages posted to and/or actions taken with respect to the DM communication, as described herein. In at least one example, the user interface 146 can include a user interface element 152 that can be selectable such that, when selected or otherwise actuated, can cause the application 142 to present another user interface element 154 (which can be a DM communication membership management interface, or the like). In FIG. 1, the user interface element 154 is presented as a pop-up, but in additional or alternative examples, the user interface element 154 can be presented as an overlay, a new user interface, or the like. In at least one example, the user interface element 154 can include an input mechanism to enable a user to identify which user(s) to add to (or remove from) the DM communication. In some examples, the user interface element 154 can include options for the user to designate (i) whether to include context data from the DM communication in a new channel and/or (ii) an amount of context data from the DM communication to include in the new channel. Additional details are described below with reference to FIGS. 2A-B and 3.

In at least one example, the operating system 144 can manage the processor(s) 134, computer-readable media 136, hardware, software, etc. of the user computing device 104.

The communication interface(s) 138 can include one or more interfaces and hardware components for enabling communication with various other devices (e.g., the user computing device 104), such as over the network(s) 106 or directly. In some examples, the communication interface(s) 138 can facilitate communication via Websockets, APIs (e.g., using API calls), HTTPs, etc.

The user computing device 104 can further be equipped with various input/output devices 140 (e.g., I/O devices). Such I/O devices 140 can include a display, various user interface controls (e.g., buttons, joystick, keyboard, mouse, touch screen, etc.), audio speakers, connection ports and so forth.

While techniques described herein are described as being performed by the DM management component 116, the channel management component 118, and the application 142, techniques described herein can be performed by any other component, or combination of components, which can be associated with the server(s) 102, the user computing device 104, or a combination thereof.

Figure 2A:
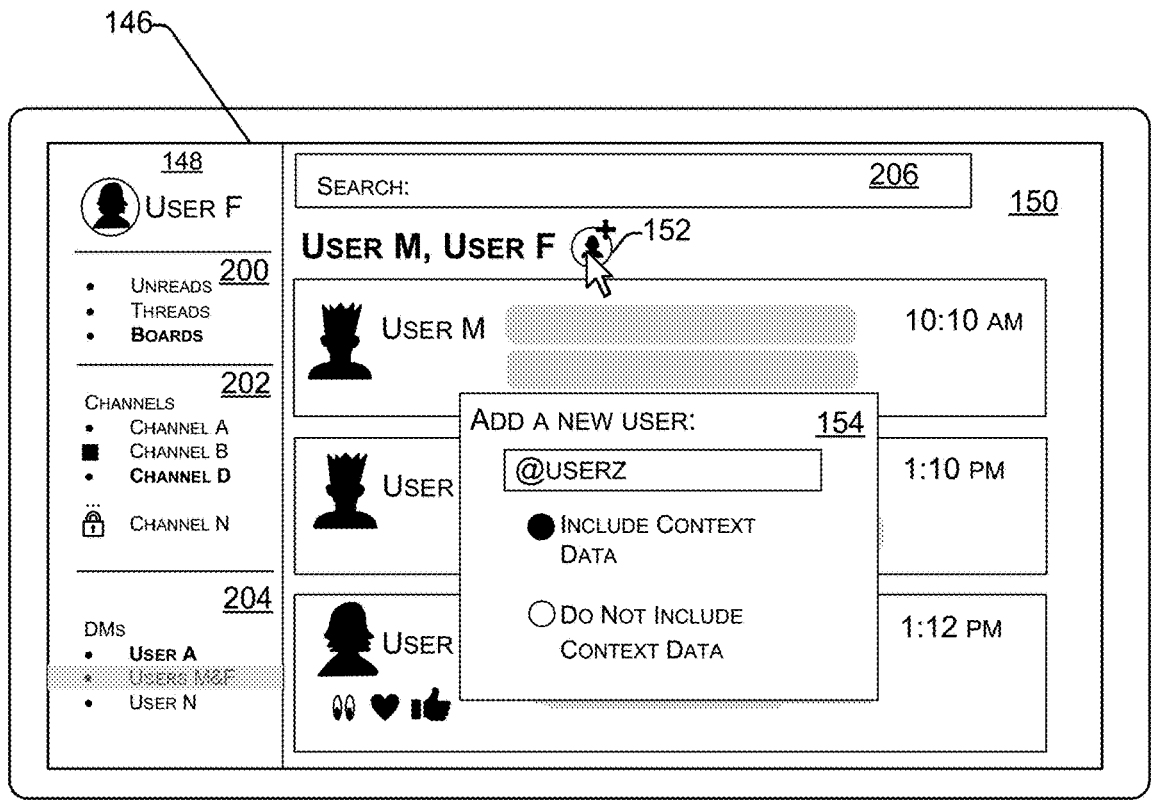
FIG. 2A illustrates an example user interface associated with adding a user to a direct message (DM) communication, as described herein.
Figure 2B:
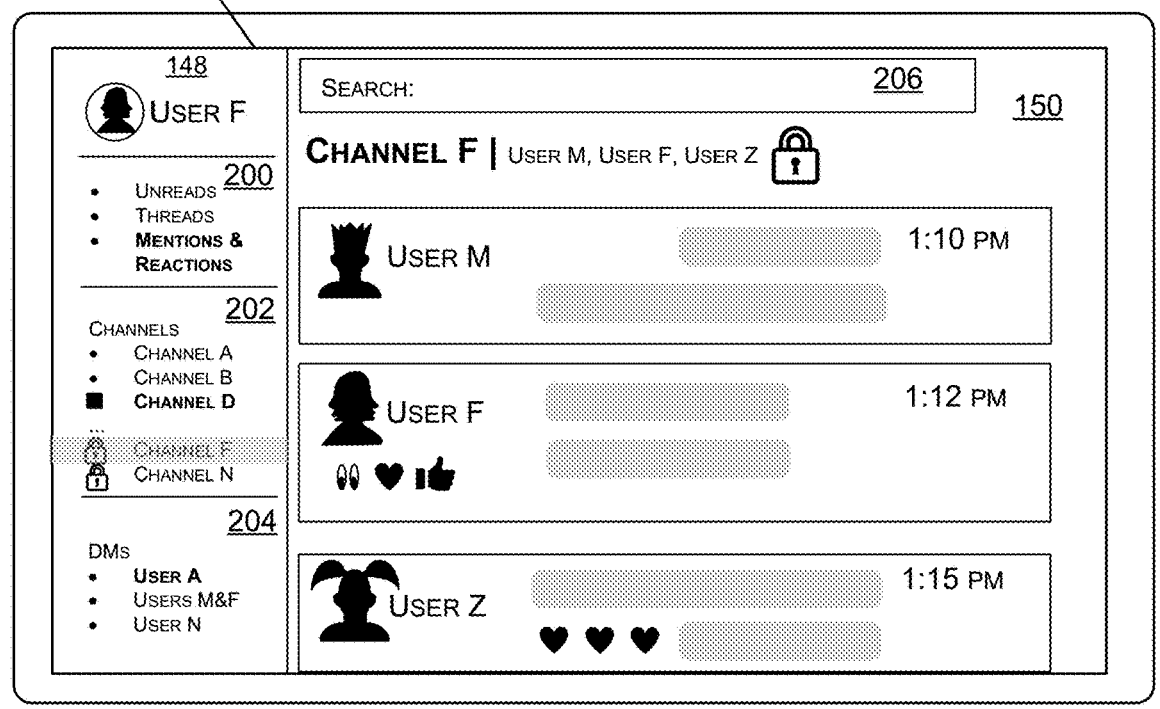
FIG. 2B illustrates another example of the user interface described in FIG. 2A wherein a new channel generated based at least in part on the DM communication from FIG. 2A is presented, as described herein.

FIGS. 2A-2B illustrate additional details associated with the user interface 146 and the user interface element 154, as described herein.

As described above, in some examples, the user interface 146 can include a first region 148, or pane, that includes indicator(s) (e.g., user interface element(s) or object(s)) representing virtual space(s) associated with the workspace(s) with which the user (e.g., account of the user) is associated. In at least one example, the first region 148 can include one or more sub-regions, or sub-panes, which can represent different virtual spaces. For example, a first sub-region 200 can include indicators representing virtual spaces that can aggregate data associated with a plurality of channels and/or workspaces. In at least one example, each virtual space can be associated with an indicator in the first sub-region 200. In some examples, an indicator can be associated with an actuation mechanism such that when actuated, can cause the application 142 to present data associated with the corresponding virtual space via the second region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second region 150, for example in a feed. In such examples, different types of events and/or actions, which can be associated with different channels and/or virtual spaces, can be presented via a same feed. In some examples, such data can be organized and/or is sortable by workspace, time, type, channel, user, or the like. In some examples, such data can be associated with an indication of which user (e.g., member of the channel) posted the message and/or performed an action. If at least one of the user or a group with which the user is associated are verified, the indication can be associated with an indicator indicating that the user and/or group is/are verified.

In some examples, each virtual space can be associated with a same type of event and/or action. For example, "threads" can be associated with messages, files, etc. posted in threads to messages posted in a channel and. That is, in some examples, same types of events and/or actions, which can be associated with different channels and/or virtual spaces, can be presented via a same feed. As with the "unreads" virtual space, data associated with such virtual spaces can be organized and/or is sortable by workspace, time, type (e.g., of action), channel, user, or the like.

In at least one example, the first region 148 of the user interface 146 can include a second sub-region 202, or sub-pane, that includes indicators representing channels. In some examples, the channels can include public channels, private channels, shared channels (e.g., between workspaces or organizations), single workspace channels, cross-workspace channels, combinations of the foregoing, or the like. In some examples, the channels represented can be associated with a single workspace. In some examples, the channels represented can be associated with different workspaces (e.g., cross-workspace). In at least one example, if a channel is cross-workspace (e.g., associated with different workspaces), the user may be associated with both workspaces, or may only be associated with one of the workspaces. In some examples, the channels represented can be associated with combinations of channels associated with a single workspace and channels associated with different workspaces.

In some examples, the second sub-region 202 can depict all channels, or a subset of all channels, that the user has permission to access (e.g., as determined by the permission data 126). In such examples, the channels can be arranged alphabetically, based on most recent interaction, based on frequency of interactions, based on channel type (e.g., public, private, shared, cross-workspace, etc.), based on workspace, in user-designated sections, or the like. In some examples, the second sub-region 202 can depict all channels, or a subset of all channels, that the user is a member of, and the user can interact with the user interface 146 to browse or view other channels that the user is not a member of but are not currently displayed in the second sub-region 202. In some examples, different types of channels (e.g., public, private, shared, etc.) can be in different sections of the second sub-region 202, or can have their own sub-regions or sub-panes in the user interface 146. In some examples, channels associated with different workspaces can be in different sections of the second sub-region 202 or can have their own regions or panes in the user interface 146.

In some examples, the indicators can be associated with user interface elements that visually differentiate types of channels. For example, Channel D is associated with a square user interface element instead of a circle user interface element. As a non-limiting example, and for the purpose of this discussion, the square user interface element can indicate that the associated channel (e.g., Channel D) is an externally shared channel. In some examples, such a user interface element can be the same for all externally shared channels. In other examples, such a user interface element can be specific to the other group with which the externally shared channel is associated. In another example, a user interface element can indicate that a channel is private (e.g., Channel N). That is, the lock icon can indicate that the channel is not discoverable by other users and other users cannot access data associated with such a channel. In some examples, additional or alternative graphical elements can be used to differentiate between public channels, private channels, shared channels, channels associated with different workspaces, and the like. In other examples, channels that the user is not a current member of may not be displayed in the second sub-region 202 of the user interface 146. In such examples, the user may navigate to a different interface (not shown) to browse additional channels that are accessible to the user but to which the user is not currently a member.

In addition to the second sub-region 202, the first region 148 can include a third sub-region 204, or sub-pane, that can include indicators representative of communications with individual users or multiple specified users (e.g., instead of all, or a subset of, members of an organization). Such communications can be referred to as DM communications, as described above. That is, the third sub-region 204, or sub-pane, can include indicators representative of virtual spaces that are associated with private messages between two or more users.

As described above, in at least one example, the user interface 146 can include a second region 150, or pane, that is associated with a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second region 150 is shown as a feed associated with a DM communication (e.g., between Users M & F). In some examples, the data in the feed can be organized and/or is sortable by date, time, type of action, user, or the like. In some examples, such data can be associated with an indication of which user posted the message and/or performed an action.

For purposes of this discussion, a "message" can refer to any electronically generated digital object provided by a user using the user computing device 104 and that is configured for display within a channel and/or other virtual space (e.g., a virtual space associated with direct message communication(s), etc.) for facilitating communications as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a channel of the communication platform can include metadata comprising a sending user identifier, a message identifier, message contents, a group identifier, a channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a channel, but instead is maintained within an object associated with the original message. Messages and/or threads can be associated with file(s), emoji(s), reactij(s), app(s), etc.

A channel, DM communication, or other virtual space can be associated with data other than messages or data that is associated with messages. For example, non-limiting examples of additional data that can be presented via the second region 150 of the user interface 146 include members added to and/or removed from a channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second region 150 can comprise a feed associated with a single channel or other virtual space. In such examples, data associated with the channel, or other virtual space, can be presented via the feed. In at least one example, data associated with a channel, or other virtual space, can be viewable to at least some of the users of a group of users associated with a same group identifier. In some examples, for members of a channel, the data of the channel (e.g., messaging communications) can be displayed to each member of the channel. For instance, a common set of group-based messaging communications can be displayed to each member of the channel such that the data of the channel (e.g., messaging communications) may not vary per member of the channel. In some examples, messaging communications associated with a channel can appear differently for different users (e.g., based on personal configurations, group membership, permissions, policies, etc.).

In some examples, and as illustrated in FIG. 2A, the second region 150 can comprise a feed associated with a DM communication. In such examples, data associated with the DM communication can be presented via the feed. In at least one example, data associated with a channel can be viewable to members of the DM communication (e.g., Users M and F). In some examples, messaging communications associated with the DM communication can appear differently for different users (e.g., based on personal configurations, group membership, permissions, policies, etc.).

In at least one example, the user interface 146 can include a search mechanism 206, wherein a user can input a search term and the server(s) 102 can perform a search associated with the communication platform. In some examples, the search can be performed across each group with which the user is associated, or the search can be restricted to a particular group, based on a user specification. In some examples, the search can be performed relative to a channel, a DM communication, and/or the like.

As described above, in FIG. 2A, the second region 150 is associated with a DM communication feed associated with a DM communication (e.g., the DM between Users M and F). In at least one example, the user interface 146 can include a user interface element 152 that can be selectable such that, when selected or otherwise actuated, can cause the application 142 to present another user interface element 154 (which can be a DM communication membership management interface, or the like). In at least one example, the application 142 can detect the selection, or other actuation, and can send an indication of such to the server(s) 102. The DM management component 116 can send an instruction to cause the user interface element 154 to be presented. In some examples, such an instruction can be associated with a "request" for information that can be provided via the user interface element 154. In FIG. 2A, the user interface element 154 is presented as a pop-up, but in additional or alternative examples, the user interface element 154 can be presented as an overlay, a new user interface, or the like.

In at least one example, the user interface element 154 can include an input mechanism to enable a user to identify which user(s) to add to (or remove from) the DM communication. In some examples, the user can input an identifier of another user to be added (or removed) from the DM communication. Such an identifier can be a mention, a userID, an email address, or the like. In some examples, the user interface element 154 can include options for the user to designate (i) whether to include context data from the DM communication in a new channel and/or (ii) an amount of context data from the DM communication to include in the new channel. In some examples, such options can be associated with their own selectable controls. While illustrated as radio buttons in FIG. 2A, options can be selected using checkboxes, dropdown lists, list boxes, buttons, toggles, text fields, date fields, time fields, or the like. In at least one example, based at least in part on detecting an input associated with the user interface element 154, the application 142 can send an indication of the input(s) (e.g., identifier(s) provided, selection(s) regarding context data, etc.) to the server(s) 102 and the channel management component 118 can generate a new channel (via interactions with the DM management component 116). Additional details are provided below.

FIG. 2B illustrates an example of the user interface 146 after an additional user has been "added" to the DM communication described above in FIG. 2A. As described above, in some examples, users may not be able to be added (or removed) from DM communications (e.g., due to permissions associated therewith). Instead, the DM management component 116 and/or the channel management component 118 can generate a new channel that can be associated with the users previously associated with the DM communication (e.g., User M and User F) and the additional user (e.g., User Z). Further, in at least one example, the new channel can be associated with at least some context data associated with the DM communication. That is, techniques described herein enable the "addition" of a user to a DM communication by generating a new channel (with an additional user added to the membership), a process that can be perceived as "converting" the DM communication to a new channel. Similarly, techniques described herein enable the "removal" of a user to a DM communication by generating a new channel (with user(s) removed from the membership), a process that can be perceived as "converting" the DM communication to a new channel.

In FIG. 2B, a new channel has been generated (e.g., Channel F) and the new channel is represented by an indicator in the second sub-region 202. That is, the new channel can be associated with a region (e.g., sub-region 202) of the user interface 146 where one or more channels are also represented, as described above. In at least one example, the second region 150 can be updated to include context data, or a portion thereof, as transferred from the original DM communication. As illustrated, the new channel comprises three members: User M, User F, and User Z (newly added). As such, each of the members can view context data associated with the new channel, interact with such context data and/or add new data, and/or otherwise communicate via the new channel as permitted by relevant permission(s).

As described above, while channels and DM communications each can provide virtual spaces for associated members to communicate, channels and DM communications can be associated with different features. That is, a channel can be associated with one or more first features which can be different than one or more second features associated with a DM communication. In at least one example, such features can be defined, at least in part, by permissions associated with each type of virtual space. In at least one example, a channel can be associated with one or more first permissions which can be different than one or more second permissions associated with a DM communication.

In at least one example, members may not be permitted to leave DM communications, but may be permitted to leave channels. In at least one example, membership of DM communications (e.g., additions or removals) may be static (e.g., may not change), but membership of channels can be dynamic such that users can be added or removed (subject to relevant permissions). In some examples, deactivated users can remain members of DM communications but may not remain members of channels. In some examples, DM communications and channels can be discoverable in different browsers, searches, or the like. In some examples, DM communications and channels can be associated with different types of additional data (e.g., topics, purposes, details, etc.), different lifecycles, and/or the like.

In at least one example, both DM communications and channels can have the same or similar features. For instance, both DM communications and channels can be shared with other groups (e.g., workspaces or organizations), as described herein, and/or can be associated with members of different groups (e.g., workspaces or organizations), having different permission(s), or the like.

In at least one example, a channel can be associated with an indicator in a first sub-region (e.g., sub-region 202) of a user interface 146 and a DM message can be associated with an indicator in a second sub-region (e.g., sub-region 204) of the user interface 146. As illustrated in FIG. 2B, the DM communication between Users M and F is associated with an indicator in the sub-region 204 and the new channel, Channel F, is associated with an indicator in the sub-region 202. In some examples, such as when all context data associated with a DM communication is transferred to a new channel, the DM communication may no longer persist and, in such examples, an indicator of such may not be presented via the sub-region 204. Further, in some examples, if membership of a DM communication is modified, even if all context data is not transferred to a new channel, the DM communication may no longer persist and, in such examples, an indicator of such may not be presented via the sub-region 204.

In some examples, the new channel can be a private channel (e.g., as indicated by the lock icon in the second region 150 and the sub-region 202) that may not be discoverable to other users of the communication platform. In some examples, the new channel can be a channel shared between two or more different organizations (e.g., if members of the channel are associated with different organizations).

Figure 3:
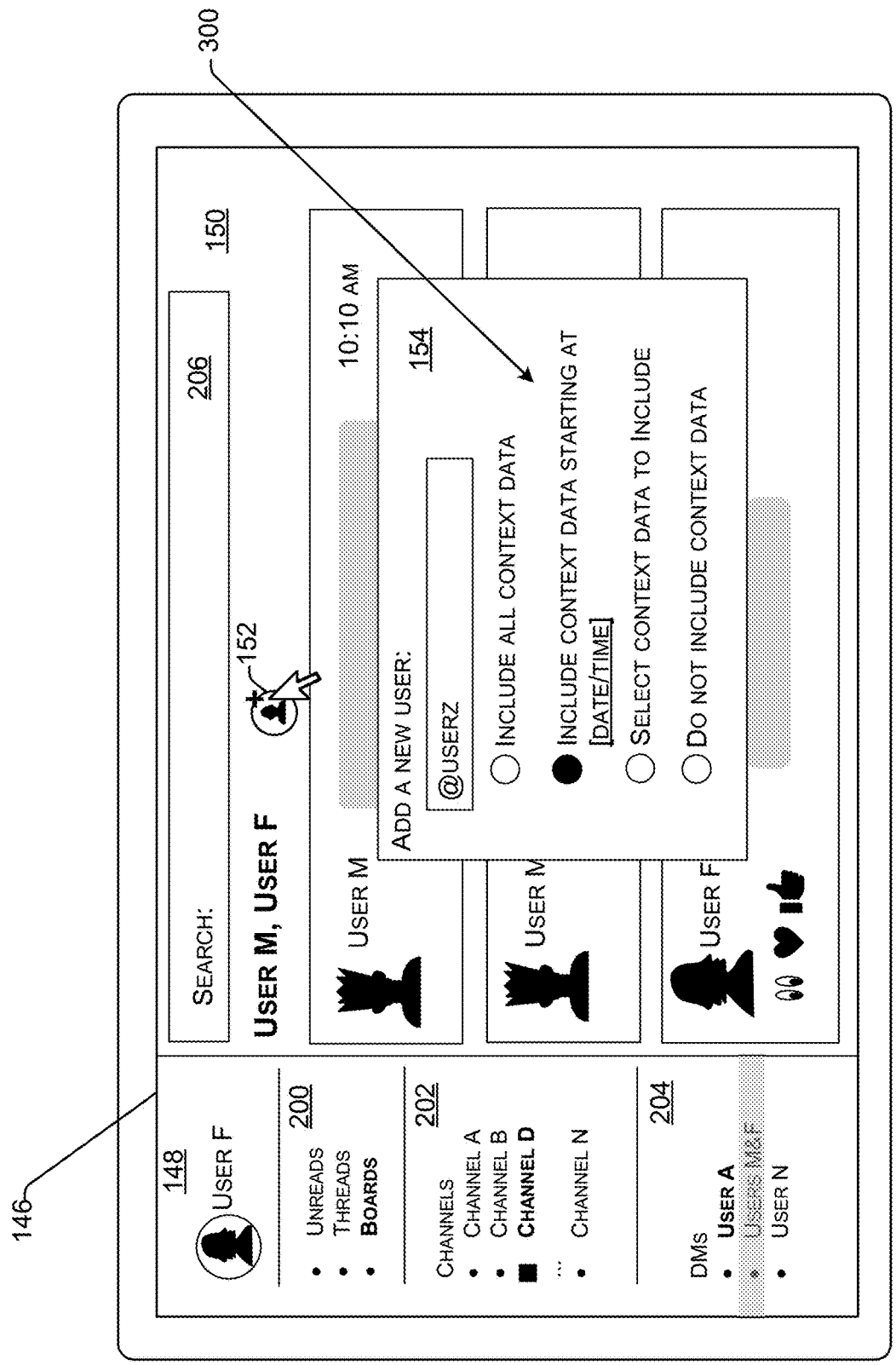
FIG. 3 illustrates another example of the user interface described in FIG. 2A associated with designating an amount of context data to associate with a new channel to be generated based at least in part on the DM communication from FIG. 2A, as described herein.

As described above, in some examples, a user can designate (i) whether to include context data from the DM communication in a new channel and/or (ii) an amount of context data to include. FIG. 3 illustrates the user interface 146 described above with reference to FIG. 1, wherein the user interface element 154 presented includes options for the user to designate (i) whether to include context data from the DM communication in a new channel and/or (ii) an amount of context data to include. In FIG. 3, the user interface element 154 include four different options 300, each associated with a radio button, which the user can select to designate (i) whether to include context data from the DM communication in a new channel and/or (ii) an amount of context data to include. The configuration and options illustrated in FIG. 3 are examples, and additional or alternative configurations and options are within the scope of this disclosure. For instance, as described above, the options can be selectable using checkboxes, dropdown lists, list boxes, buttons, toggles, text fields, date fields, time fields, or the like. Further, more or fewer options can be presented via the user interface element 154.

In some examples, an option presented via the user interface element 154 can enable all context data associated with a DM communication to be transferred to the new channel. In such examples, based at least in part on detecting a selection of a selectable control associated with such an option, the application 142 can send an indication of such to the DM management component 116, which can provide the indication to the channel management component 118. The channel management component 118 can associate all of the context data associated with the DM communication with the new channel. In at least one example, the channel management component 118 can "transfer" context data from the DM communication to the new channel by duplicating the context data in the DM communication and associating duplicated context data with the new channel, moving the context data from the DM communication to the new channel, or the like. That is, in some examples, the channel management component 118 can duplicate (e.g., copy) the context data and associate the duplicated context data with the new channel. In such an example, the context data can persist in the DM communication (and thus the DM communication can persist, too). In some examples, the channel management component 118 can move the context data from the DM communication to the new channel. In such examples, the DM communication may no longer exist.

In some examples, an option presented via the user interface element 154 can enable a portion of the context data associated with a DM communication to be transferred to the new channel. In some examples, such options can enable selection or designation that context data associated with a characteristic (e.g., date, time, period of time, topic, etc.) is to be transferred to a new channel. That is, a user can interact with the user interface 146 and/or the user interface element 154 to designate an amount of context data to be associated with a new channel by designating a characteristic with which at least a portion of the context data is associated. Context data associated with the designated characteristic can be transferred to the new channel. Additional details are provided below.

In some examples, the user interface element 154 can enable a user to designate a date, such that context data associated with the DM communication on or after the date is to be associated with the new channel. In such examples, based at least in part on detecting a selection of a selectable control associated with such an option and/or the designated date, the application 142 can send an indication of such to the DM management component 116, which can provide the indication to the channel management component 118. The channel management component 118 can determine the portion of the context data to be associated with the new channel (e.g., based at least in part on such an indication) and can associate the portion of the context data with the new channel. That is, context data associated with the DM communication on or after the designated date can be associated with the new channel. As described above, in some examples, the channel management component 118 can duplicate (e.g., copy) the portion of the context data and associate the duplicated portion of the context data with the new channel. In such an example, the context data can persist in the DM communication. In some examples, the channel management component 118 can move the portion of the context data from the DM communication to the new channel. In some such examples, any context data that was not moved to the new channel can persist in the DM communication.

In some examples, the user interface element 154 can enable a user to designate a time, such that context data associated with the DM communication on or after the time is to be associated with the new channel. In such examples, based at least in part on detecting a selection of a selectable control associated with such an option and/or the designated time, the application 142 can send an indication of such to the DM management component 116, which can provide the indication to the channel management component 118. The channel management component 118 can determine the portion of the context data to be associated with the new channel (e.g., based at least in part on the indication) and can associate the portion of the context data with the new channel. That is, context data associated with the DM communication on or after the designated time can be associated with the new channel. In some examples, the channel management component 118 can duplicate (e.g., copy) the portion of the context data and associate the duplicated portion of the context data with the new channel. In such an example, the context data can persist in the DM communication. In some examples, the channel management component 118 can move the portion of the context data from the DM communication to the new channel. In some such examples, any context data that was not moved to the new channel can persist in the DM communication.

In some examples, the user interface element 154 can enable a user to designate a period of time, such that context data associated with the DM communication during the period of time is to be associated with the new channel. In such examples, based at least in part on detecting a selection of a selectable control associated with such an option and/or the designated period of time, the application 142 can send an indication of such to the DM management component 116, which can provide the indication to the channel management component 118. The channel management component 118 can determine the portion of the context data to be associated with the new channel (e.g., based at least in part on the indication) and can associate the portion of the context data with the new channel. That is, context data associated with the DM communication during the designated period of time can be associated with the new channel. In some examples, the channel management component 118 can duplicate (e.g., copy) the portion of the context data and associate the duplicated portion of the context data with the new channel. In such an example, the context data can persist in the DM communication. In some examples, the channel management component 118 can move the portion of the context data from the DM communication to the new channel. In some such examples, any context data that was not moved to the new channel can persist in the DM communication.

In some examples, the user interface element 154 can enable a user to designate a topic, such that context data associated with the DM communication associated with the topic is to be associated with the new channel. In such examples, based at least in part on detecting a selection of a selectable control associated with such an option and/or the designated topic, the application 142 can send an indication of such to the DM management component 116, which can provide the indication to the channel management component 118. The channel management component 118 can determine the portion of the context data to be associated with the new channel (e.g., based at least in part on the indication) and can associate the portion of the context data with the new channel. That is, context data associated with the DM communication associated with the designated topic can be associated with the new channel. In some examples, the channel management component 118 can duplicate (e.g., copy) the portion of the context data and associate the duplicated portion of the context data with the new channel. In such an example, the context data can persist in the DM communication. In some examples, the channel management component 118 can move the portion of the context data from the DM communication to the new channel. In some such examples, any context data that was not moved to the new channel can persist in the DM communication.

In some examples, the user interface element 154 can enable a user to designate particular message(s) or data that is to be associated with the new channel. In such examples, based at least in part on detecting a selection of a selectable control associated with such an option, the application 142 can send an indication of such to the DM management component 116, which can provide the indication to the channel management component 118. In some examples, the DM management component 116 can prompt the user to identify the particular message(s) or data via the user interface 146. The user can interact with the user interface and the application 142 can send an indication of the selected message(s) or data to the DM management component 116, which can provide the indication to the channel management component 118. The channel management component 118 can determine the portion of the context data to be associated with the new channel (e.g., the selected message(s) or data) and can associate the portion of the context data with the new channel. In some examples, the channel management component 118 can duplicate (e.g., copy) the portion of the context data and associate the duplicated portion of the context data with the new channel. In such an example, the context data can persist in the DM communication. In some examples, the channel management component 118 can move the portion of the context data from the DM communication to the new channel. In some such examples, any context data that was not moved to the new channel can persist in the DM communication.

In some examples, the DM management component 116 and/or the channel management component 118 can analyze context data associated with the DM communication and recommend individual message(s) or data to associate with the new channel. That is, the DM management component 116 and/or the channel management component 118 can analyze context data associated with the DM communication using natural language processing, image recognition, or other data parsing techniques to identify context data to recommend for association with the new channel. In some examples, a machine-learning mechanism can be trained to output a relevance score and message(s) and/or data associated with a relevance score that meets or exceeds a threshold (e.g., relevance to the to-be-added users, etc.) can be recommended for association with the new channel. In some examples, the DM management component 116 and/or the channel management component 118 can cause a recommendation to be presented via the user interface 146, via the user interface element 154 or otherwise. In at least one example, based at least in part on the user providing an input indicating that the recommended context data is to be associated with the new channel, the channel management component 118 can receive such an input (e.g., via the application 142) and can determine the portion of the context data to be associated with the new channel (e.g., the recommended message(s) or data). The channel management component 118 can then associate the portion of the context data with the new channel. In some examples, the channel management component 118 can duplicate (e.g., copy) the portion of the context data and associate the duplicated portion of the context data with the new channel. In such an example, the context data can persist in the DM communication. In some examples, the channel management component 118 can move the portion of the context data from the DM communication to the new channel. In some such examples, any context data that was not moved to the new channel can persist in the DM communication.

As described above, additional or alternative options can be presented via the user interface element 154 to enable the user to designate (i) whether to include context data or (ii) an amount of context data to include in a new channel that is to be generated based on an existing DM communication in a response to a modification of membership of the DM communication.

The user interface 146 described above with reference to FIGS. 1-3 is a non-limiting example of a user interface that can be presented via the user computing device 104 (e.g., by the application 142). In some examples, the application 142 can receive data from the DM management component 116 and/or channel management component 118 and the application 142 can generate and present the user interface 146 based on the data. In other examples, the application 142 can receive data and/or instructions for generating the user interface 146 from the DM management component 116 and/or channel management component 118. In such an example, the application 142 can present the user interface 146 based on the instructions. Additional or alternative data can be presented via a user interface and additional or alternative configurations can be imagined.

Furthermore, while FIGS. 1-3 describe generating a new channel based on a request to modify membership of a DM communication, in some examples, an additional user can be added and/or a user can be removed via creation of a new DM communication instead of a new channel. That is, in an example, a first user associated with a DM communication can request to add a second user to the DM communication and the DM management component 116 can generate a new DM communication. In some examples, the first user can interact with a user interface element, similar to the user interface elements described above, to designate (i) whether to include context data or (ii) an amount of context data to include in the new DM communication that is to be generated based on the existing DM communication in response to the addition of the second user of the DM communication. Similarly, a new DM communication can be generated in response to a request to remove a member from a DM communication.

FIGS. 4-7 are flowcharts showing example processes involving techniques as described herein. The processes illustrated in FIGS. 4-7 are described with reference to components described above with reference to the environment 100 shown in FIG. 1 for convenience and ease of understanding. However, the processes illustrated in FIGS. 4-7 are not limited to being performed using the components described above with reference to the environment 100. Moreover, the components described above with reference to the environment 100 are not limited to performing the processes illustrated in FIGS. 4-7.

The processes in FIGS. 4-7 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 4-7 can be combined in whole or in part with each other or with other processes.

Figure 4:
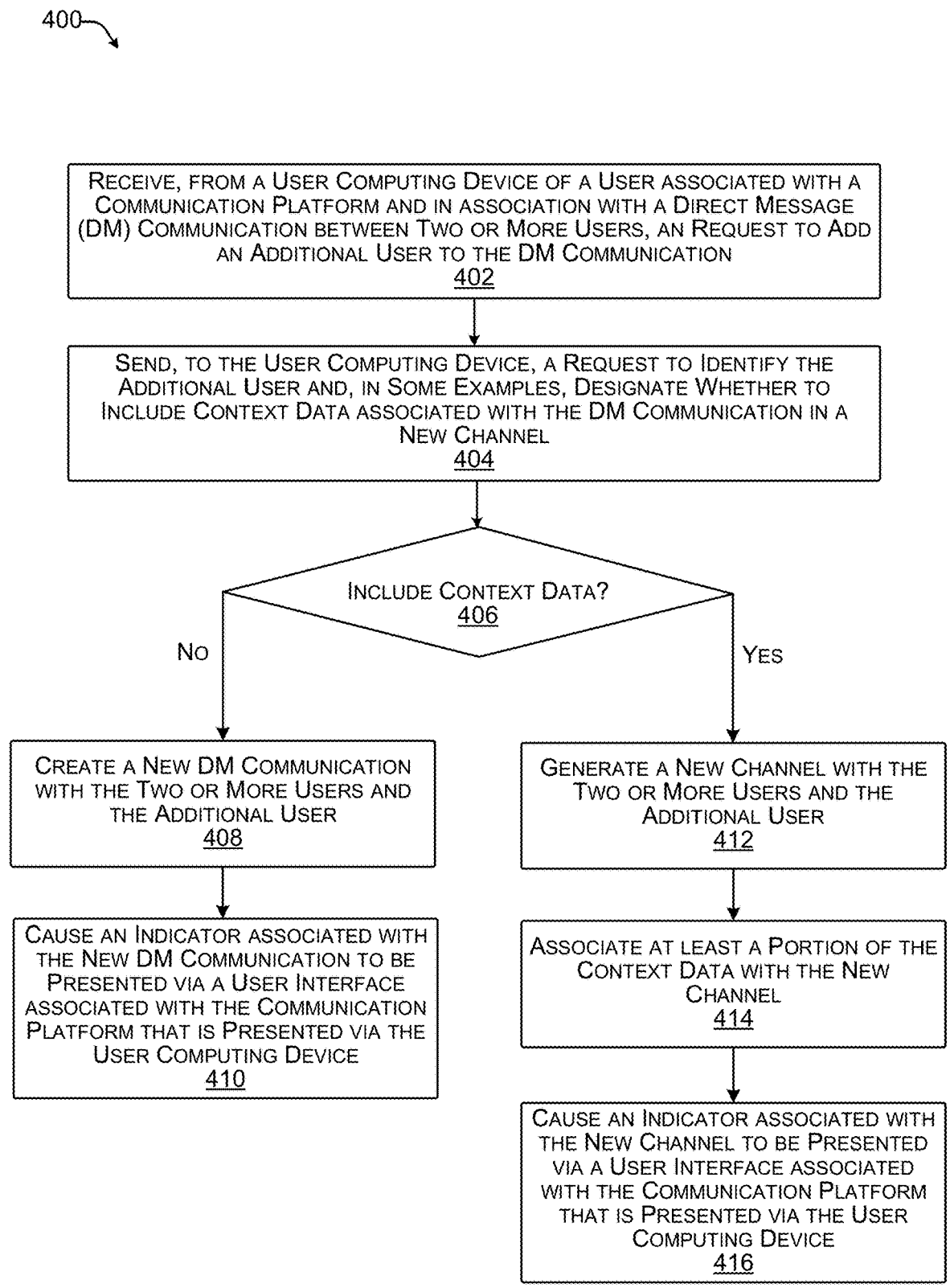
FIG. 4 illustrates an example process for adding an additional user to an existing DM communication between two or more other users, as described herein.

FIG. 4 illustrates an example process 400 for adding an additional user to an existing DM communication between two or more other users, as described herein.

At operation 402, the DM management component 116 can receive, from a user computing device 104 of a user associated with a communication platform and in association with a DM communication, a request to add an additional user to the DM communication. In at least one example, a user associated with a DM communication can interact with a user interface, such as the user interface 146, presented via the user computing device 104 to request to add another user to the DM communication. In some examples, the user interface 146 can include a user interface element, such as the user interface element 152 described above, that is selectable, or can otherwise be actuated, to cause a request to be sent from the user computing device 104 to the server(s) 102 via the network(s) 106. In at least one example, the application 142 can detect actuation of the user interface element 152 and can send a request to the server(s) 102. In at least one example, the DM management component 116 can receive such a request.

At operation 404, the DM management component 116 can send, to the user computing device 104, a request to identify the additional user and, in some examples, designate whether to include context data associated with the DM communication in a new channel. In at least one example, the DM management component 116 can receive the request to add a user to a DM communication and can send a request back to the user computing device 104, prompting the user to identify the additional user to be added and, in some examples, designate (i) whether to include context data from the DM communication in a (to be generated) new channel and/or (ii) an amount of context data from the DM communication to include in the new channel. Such a request (e.g., from the DM management component 116) can cause a user interface element, such as the user interface element 154, to be presented via the user interface 146 that can be presented via a user computing device 104 of the requesting user.

In an additional or alternative example, a user can request to add an additional user to a DM communication by mentioning the user in a message associated with the DM communication, performing a search for the user and selecting an option to add the user to the DM communication, or the like. In such an example, the DM management component 116 may not request the user to identify the additional user. In such an example, the DM management component 116 may still request that the user designate (i) whether to include context data from the DM communication in a (to be generated) new channel and/or (ii) an amount of context data from the DM communication to include in the new channel.

At operation 406, the DM management component 116 can determine whether to include context data from the DM communication in the new channel. In at least one example, the DM management component 116 can receive input (or an indication thereof) provided via the user interface 146 and/or user interface element 154 presented via the user interface 146. In at least one example, the application 142 can send such input (or an indication thereof) to the DM management component 116. Such input can include an identifier associated with the additional user to be added and, in some examples, an indication of (i) whether to include context data from the DM communication in a (to be generated) new channel and/or (ii) an amount of context data from the DM communication to include in the new channel. In at least one example, if the indication indicates that the user opted not to include context data and/or selected an option associated with not providing any context data (i.e., "no" at operation 406), the DM management component 116 can create a new DM communication with the two or more users and the additional user, as illustrated at operation 408. In such an example, the new DM communication may not include any context data and the members of the new DM communication can include the two or more users and the additional user.

At operation 410, the channel management component 118 can cause an indicator associated with the new DM communication to be presented via a user interface associated with the communication platform that is presented via the user computing device 104. As described above, in some examples, the user interface 146 can include a first region 148, or pane, that includes indicator(s) (e.g., user interface element(s) or object(s)) representing virtual space(s) associated with the workspace(s) with which the user (e.g., account of the user) is associated. In at least one example, the first region 148 can include one or more sub-regions, or sub-panes, which can represent different virtual spaces. For example, a first sub-region 200 can include indicators representing virtual spaces that can aggregate data associated with a plurality of channels and/or workspaces. In at least one example, each virtual space can be associated with an indicator in the first sub-region 200. In at least one example, the first region 148 of the user interface 146 can include a second sub-region 202, or sub-pane, that includes indicators representing channels. In some examples, the channels can include public channels, private channels, shared channels (e.g., between workspaces or organizations), single workspace channels, cross-workspace channels, combinations of the foregoing, or the like. In addition to the second sub-region 202, the first region 148 can include a third sub-region 204, or sub-pane, that can include indicators representative of communications with individual users or multiple specified users (e.g., instead of all, or a subset of, members of an organization). Such communications can be referred to as DM communications, as described above. In at least one example, an indicator associated with the new DM communication can be presented via the third sub-region 204 of the user interface 146.

In an alternative example, a new channel can be generated, as described herein, instead of a new DM communication. In such an example, however, the new channel may not include any context data.

If the user provides an input to include at least some context data (i.e., "yes" at operation 406), the DM management component 116 can provide an indication of such to the channel management component 118. In at least one example, based at least in part on the user indicating to include at least a portion of the context data, the channel management component 118 can generate a new channel with the two or more users and the additional user, as illustrated at operation 412. That is, in at least one example, if the input is associated with an indication to include all of the context data or some of the context data associated with the DM communication, the DM management component 116 can provide an indication of such to the channel management component 118. The channel management component 118 can generate a new channel, wherein the two or more users and the additional user are members of the new channel. In at least one example, the new channel can be associated with a data structure, wherein indications of the two or more users and the additional user are associated therewith as members of the new channel. Additional details associated with determining an amount of context data to be included in the new channel are described below in FIG. 6 and additional details associated with generating a new channel are described below in FIG. 7.

At operation 414, the channel management component 118 can associate at least a portion of the context data with the new channel. In at least one example, the channel management component 118 can associate the designated amount of context data with the channel. In at least one example, the channel management component 118 can associate the designated amount of context data with the new channel by "transferring" the designated context data from the DM communication (e.g., a data structure associated therewith) to the new channel (e.g., a data structure associated therewith). As described above, in some examples, such "transferring" can be done by duplicating the designated context data in the DM communication and associating the duplicated context data with the new channel, moving the designated context data from the DM communication to the new channel, or the like. That is, in some examples, the channel management component 118 can duplicate (e.g., copy) the designated context data and associate the duplicated context data with the new channel. In such an example, the duplicated context data can persist in the DM communication (and thus the DM communication can persist, too). In some examples, the channel management component 118 can move the designated context data from the DM communication to the new channel. In such examples, such context data may no longer exist in the DM communication and, if all context data is moved, the DM communication may no longer exist.

At operation 416, the channel management component 118 can cause an indicator associated with the new channel to be presented via a user interface associated with the communication platform that is presented via the user computing device 104. As described above, in some examples, the user interface 146 can include different regions that can include indicator(s) (e.g., user interface element(s) or object(s)) representing virtual space(s) associated with the workspace(s) with which the user (e.g., account of the user) is associated. In at least one example, the first region 148 can include one or more sub-regions, or sub-panes, which can represent different virtual spaces. For example, a first sub-region 200 can include indicators representing virtual spaces that can aggregate data associated with a plurality of channels and/or workspaces, a second sub-region 202, or sub-pane, that includes indicators representing channels, and a third sub-region 204, or sub-pane, that can include indicators representative of communications with individual users or multiple specified users (e.g., instead of all, or a subset of, members of an organization).

As illustrated in FIGS. 2A and 2B above, prior to the new channel being generated, the DM communication can be associated with an indicator presented via the third sub-region 204. After the new channel is generated, the channel management component 118 can cause an indicator associated with the new channel to be presented via the second sub-region 202. If the DM communication still exists, it can continue to be presented via the third sub-region 204. In at least one example, if the user selects, or otherwise actuates, the indicator associated with the new channel, at least a portion of the context data can be presented via the second region 150 of the user interface 146. That is, based at least in part on detecting an input indication a selection, or other actuation, the indicator associated with the new channel, the channel management component 118 can cause at least a portion of the context data to be presented via the second region 150 of the user interface 146, as a feed, for example.

Figure 5:
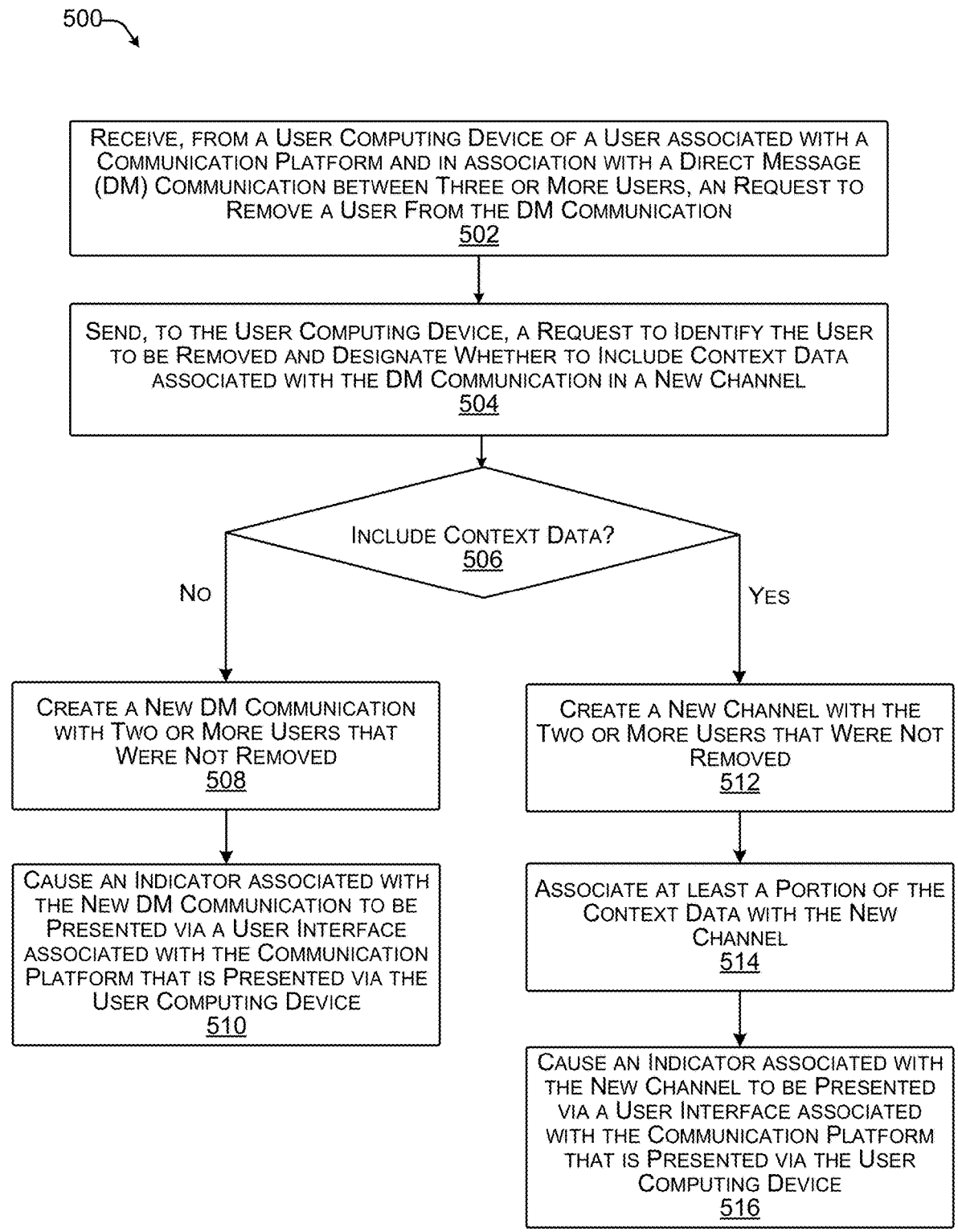
FIG. 5 illustrates an example process for removing a user from a DM communication between three or more users, as described herein.

FIG. 5 illustrates an example process 500 for removing a user from a DM communication between three or more users, as described herein.

At operation 502, the DM management component 116 can receive, from a user computing device 104 of a user associated with a communication platform and in association with a DM communication between three or more users, a request to remove a user from the DM communication. In at least one example, a user associated with a DM communication can interact with a user interface, such as the user interface 146, presented via the user computing device 104 to request to remove a user from the DM communication. In some examples, the user interface 146 can include a user interface element, such as the user interface element 152 described above, that is selectable, or can otherwise be actuated, to cause a request to be sent from the user computing device 104 to the server(s) 102 via the network(s) 106. In at least one example, the application 142 can detect actuation of the user interface element 512 and can send a request to the server(s) 102. In at least one example, the DM management component 116 can receive such a request.

At operation 504, the DM management component 116 can send, to the user computing device 104, a request to identify the user to be removed and, in some examples, designate whether to include context data associated with the DM communication in a new channel. In at least one example, the DM management component 116 can receive the request to add a user to a DM communication and can send a request back to the user computing device 104, prompting the user to identify the user to be removed from the DM communication and, in some examples, designate (i) whether to include context data from the DM communication in a (to be generated) new channel and/or (ii) an amount of context data from the DM communication to include in the new channel. Such a request (e.g., from the DM management component 116) can cause a user interface element, such as the user interface element 154, to be presented via a user interface 146 that can be presented via a user computing device 104 of the requesting user.

At operation 506, the DM management component 116 can determine whether to include context data from the DM communication in the new channel. In at least one example, the DM management component 116 can receive input provided via the user interface and/or user interface element presented via the user interface (or an indication thereof). In at least one example, the application 142 can send such input (or an indication thereof) to the DM management component 116. Such input can include an identifier associated with the user to be removed from the DM communication and, in some examples, an indication of (i) whether to include context data from the DM communication in a (to be generated) new channel and/or (ii) an amount of context data from the DM communication to include in the new channel.

In at least one example, if the indication indicates that the user opted not to include context data and/or selected an option associated with not providing any context data (i.e., "no" at operation 506), the DM management component 116 can create a new DM communication with two or more users that were not removed, as illustrated at operation 508. In such an example, the new DM communication may not include any context data and the members of the new DM communication can include the two or more users that were not removed.

At operation 510, the channel management component 118 can cause an indicator associated with the new DM communication to be presented via a user interface associated with the communication platform that is presented via the user computing device 104. As described above, in some examples, the user interface 146 can include a first region 148, or pane, that includes indicator(s) (e.g., user interface element(s) or object(s)) representing virtual space(s) associated with the workspace(s) with which the user (e.g., account of the user) is associated. In at least one example, the first region 148 can include one or more sub-regions, or sub-panes, which can represent different virtual spaces. For example, a first sub-region 200 can include indicators representing virtual spaces that can aggregate data associated with a plurality of channels and/or workspaces. In at least one example, each virtual space can be associated with an indicator in the first sub-region 200. In at least one example, the first region 148 of the user interface 146 can include a second sub-region 202, or sub-pane, that includes indicators representing channels. In some examples, the channels can include public channels, private channels, shared channels (e.g., between workspaces or organizations), single workspace channels, cross-workspace channels, combinations of the foregoing, or the like. In addition to the second sub-region 202, the first region 148 can include a third sub-region 204, or sub-pane, that can include indicators representative of communications with individual users or multiple specified users (e.g., instead of all, or a subset of, members of an organization). Such communications can be referred to as DM communications, as described above. In at least one example, an indicator associated with the new DM communication can be presented via the third sub-region 204 of the user interface 146.

In an alternative example, a new channel can be generated, as described herein, instead of a new DM communication. In such an example, however, the new channel may not include any context data.

If the user provides an input to include at least some context data (i.e., "yes" at operation 506), the DM management component 116 can provide an indication of such to the channel management component 118. In at least one example, based at least in part on the user indicating to include at least a portion of the context data, the channel management component 118 can generate a new channel with the two or more users that were not removed, as illustrated at operation 512. That is, in at least one example, if the input is associated with an indication to include all of the context data or some of the context data associated with the DM communication, the DM management component 116 can provide an indication of such to the channel management component 118. The channel management component 118 can generate a new channel, wherein the two or more users that were not removed are members of the new channel. In at least one example, the new channel can be associated with a data structure, wherein indications of the two or more users that were not removed are associated therewith as members of the new channel. Additional details associated with determining an amount of context data to be included in the new channel are described above in FIG. 6 and additional details associated with generating a new channel are described above in FIG. 7.

At operation 514, the channel management component 118 can associate at least a portion of the context data with the new channel. In at least one example, the channel management component 118 can associate the designated amount of context data with the channel. In at least one example, the channel management component 118 can associate the designated amount of context data with the new channel by "transferring" the designated context data from the DM communication (e.g., a data structure associated therewith) to the new channel (e.g., a data structure associated therewith). As described above, in some examples, such "transferring" can be done by duplicating the designated context data in the DM communication and associating the duplicated context data with the new channel, moving the designated context data from the DM communication to the new channel, or the like. That is, in some examples, the channel management component 118 can duplicate (e.g., copy) the designated context data and associate the duplicated context data with the new channel. In such an example, the duplicated context data can persist in the DM communication (and thus the DM communication can persist, too). In some examples, the channel management component 118 can move the designated context data from the DM communication to the new channel. In such examples, such context data may no longer exist in the DM communication and, if all context data is moved, the DM communication may no longer exist.

At operation 516, the channel management component 118 can cause an indicator associated with the new channel to be presented via a user interface associated with the communication platform that is presented via the user computing device 104. As described above, in some examples, the user interface 146 can include different regions that can include indicator(s) (e.g., user interface element(s) or object(s)) representing virtual space(s) associated with the workspace(s) with which the user (e.g., account of the user) is associated. In at least one example, the first region 148 can include one or more sub-regions, or sub-panes, which can represent different virtual spaces. For example, a first sub-region 200 can include indicators representing virtual spaces that can aggregate data associated with a plurality of channels and/or workspaces, a second sub-region 202, or sub-pane, that includes indicators representing channels, and a third sub-region 204, or sub-pane, that can include indicators representative of communications with individual users or multiple specified users (e.g., instead of all, or a subset of, members of an organization).

As illustrated in FIGS. 2A and 2B above, prior to the new channel being generated, the DM communication can be associated with an indicator presented via the third sub-region 204. After the new channel is generated, the channel management component 118 can cause an indicator associated with the new channel to be presented via the second sub-region 202. If the DM communication still exists, it can continue to be presented via the third sub-region 204. In at least one example, if the user selects, or otherwise actuates, the indicator associated with the new channel, at least a portion of the context data can be presented via the second region 150 of the user interface 146. That is, based at least in part on detecting an input indication a selection, or other actuation, the indicator associated with the new channel, the channel management component 118 can cause at least a portion of the context data to be presented via the second region 150 of the user interface 146, as a feed, for example.

Figure 6:
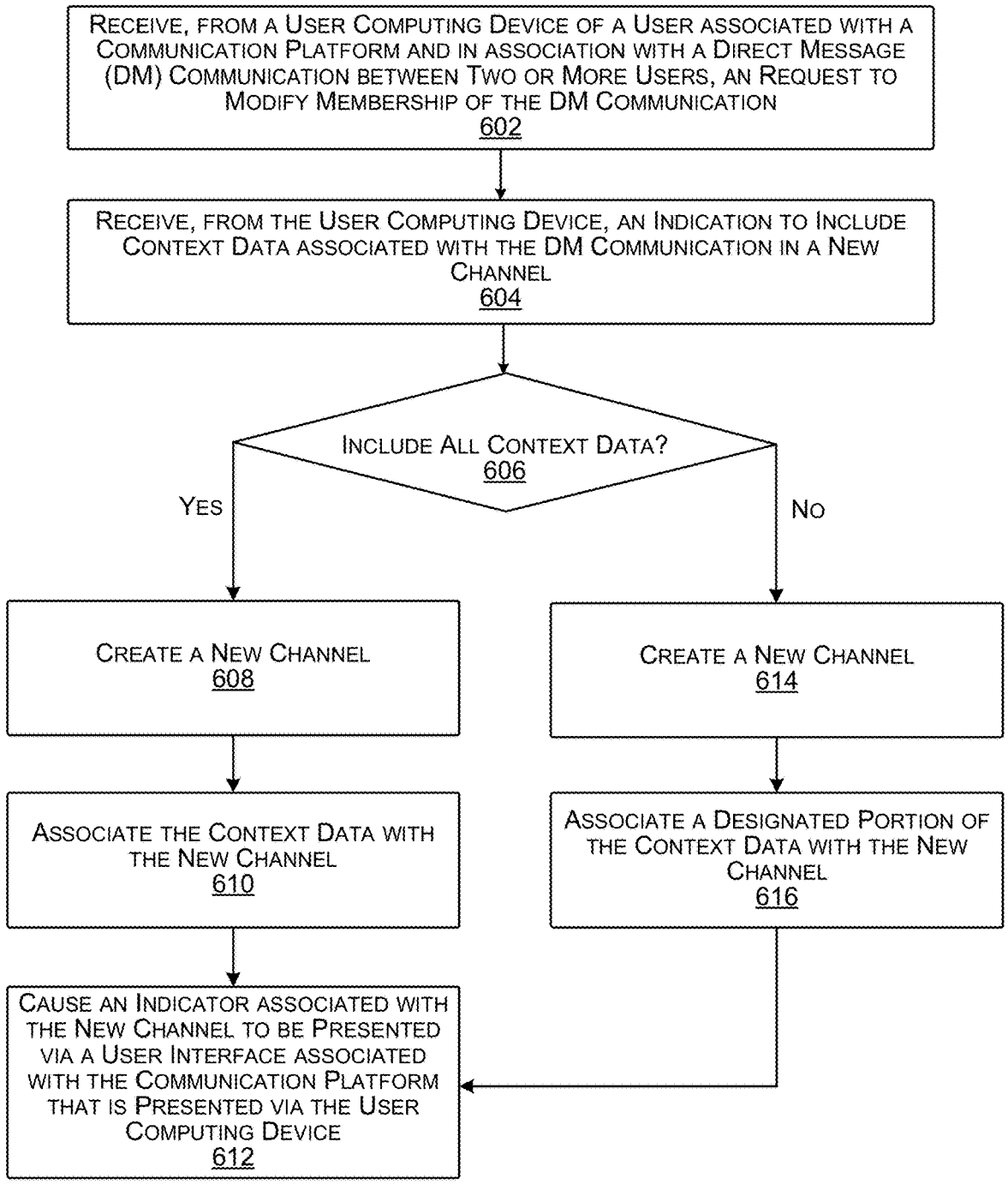
FIG. 6 illustrates an example process for determining an amount of context data to associate with a new channel generated based at least in part on an existing DM communication, as described herein.

FIG. 6 illustrates an example process 600 for determining an amount of context data to associate with a new channel generated based at least in part on a DM communication, as described herein.

At operation 602, the DM management component 116 can receive, from a user computing device 104 of a user associated with a communication platform and in association with a DM communication, a request to modify membership of the DM communication, as described above with reference to operation 402 of FIG. 4 or operation 502 of FIG. 5.

At operation 604, the DM management component 116 can receive, from the user computing device, an indication to include context data associated with the DM communication in a new channel. As described above, a user can provide an input via a user interface element, such as the user interface element 154, presented via a user interface, such as the user interface 146, presented via the user computing device 104. For example, a user can interact with a user interface element such as the user interface element 164 to provide an indication to include context data with the new channel and, in some examples, an amount of context data to include with the new channel. The application 142 can receive such input and send the input to the DM management component 116. In at least one example, the DM management component 116 can receive the input (or an indication of such) and can provide the input (or an indication of such) to the channel management component 118.

At operation 606, the DM management component 116 can determine whether the indication to include context data indicates that all of the context data is to be included in the new channel or a portion of the context data is to be included in the new channel. If the user provides an input to include all of the context data, the DM management component 116 can provide an indication of such to the channel management component 118. In at least one example, based at least in part on the input (or an indication thereof) indicating to include at least some context data, the channel management component 118 can generate a new channel, as illustrated at operation 608. In at least one example, the new channel can be associated with a different group of users than the DM communication. That is, the DM communication can be associated with a first group of users and the new channel can be associated with a second group of users, wherein a user is added to the first group of users (and thus, the second group of users includes the first group of users and the additional user) and/or a user is removed from the first group of users (and thus, the second group of users does not include the removed user). In at least one example, based at least in part on the input (or an indication thereof) indicating to include all of the context data associated with the DM communication, the new channel can be associated with all of the context data. That is, the channel management component 118 can associate all of the context data associated with the DM communication (e.g., a data structure associated therewith) with the new channel (e.g., a data structure associated therewith), as illustrated at operation 610. Additional details associated with generating a new channel, and associating context data therewith, are described in FIG. 7.

At operation 612, the channel management component 118 can cause an indicator associated with the new channel to be presented via a user interface associated with the communication platform that is presented via the user computing device 104. As described above, in some examples, the user interface 146 can include different regions that can include indicator(s) (e.g., user interface element(s) or object(s)) representing virtual space(s) associated with the workspace(s) with which the user (e.g., account of the user) is associated. In at least one example, the first region 148 can include one or more sub-regions, or sub-panes, which can represent different virtual spaces. For example, a first sub-region 200 can include indicators representing virtual spaces that can aggregate data associated with a plurality of channels and/or workspaces, a second sub-region 202, or sub-pane, that includes indicators representing channels, and a third sub-region 204, or sub-pane, that can include indicators representative of communications with individual users or multiple specified users (e.g., instead of all, or a subset of, members of an organization).

As illustrated in FIGS. 2A and 2B above, prior to the new channel being generated, the DM communication can be associated with an indicator presented via the third sub-region 204. After the new channel is generated, the channel management component 118 can cause an indicator associated with the new channel to be presented via the second sub-region 202. If the DM communication still exists, it can continue to be presented via the third sub-region 204. In at least one example, if the user selects, or otherwise actuates, the indicator associated with the new channel, at least a portion of the context data can be presented via the second region 150 of the user interface 146. That is, based at least in part on detecting an input indication a selection, or other actuation, the indicator associated with the new channel, the channel management component 118 can cause at least a portion of the context data to be presented via the second region 150 of the user interface 146, as a feed, for example.

As described above, in some examples, an option presented via the user interface element 154 can enable a portion of the context data associated with a DM communication to be transferred to the new channel. For example, an option presented via the user interface element 154 can enable the user to designate context data associated with a characteristic (e.g., date, time, period of time, topic, etc.) to be transferred to the new channel. As described above with reference to FIG. 3, in some examples, the user interface element 154 can enable a user to designate a date, such that context data associated with the DM communication on or after the date is to be associated with the new channel. In some examples, the user interface element 154 can enable a user to designate a time, such that context data associated with the DM communication on or after the time is to be associated with the new channel. In some examples, the user interface element 154 can enable a user to designate a period of time, such that context data associated with the DM communication during the period of time is to be associated with the new channel. In some examples, the user interface element 154 can enable a user to designate a topic, such that context data associated with the DM communication associated with the topic is to be associated with the new channel.

In some examples, the user interface element 154 can enable a user to designate particular message(s) or data that is to be associated with the new channel. In at least one example, based at least in part on detecting a selection of a selectable control associated with a particular option (e.g., associated with a particular characteristic) and/or receiving input associated with selected message(s) and/or data, the application 142 can send an indication of such to the DM management component 116, which can provide the indication to the channel management component 118.

As described above, in some examples, the DM management component 116 and/or the channel management component 118 can analyze context data associated with the DM communication and recommend individual message(s) or data to associate with the new channel. In some examples, the DM management component 116 and/or the channel management component 118 can cause a recommendation to be presented via the user interface 146, via the user interface element 154 or otherwise. In at least one example, based at least in part on the user providing an input indicating that the recommended context data is to be associated with the new channel, the channel management component 118 can receive such an input (e.g., via the application 142).

If the user provides an input to include less than all of the context data (i.e., a portion of the context data), the DM management component 116 can provide an indication of the designated context data to the channel management component 118, and the channel management component 118 can determine the context data to be associated with the new channel based at least in part on the such indication. In at least one example, the channel management component 118 can generate a new channel, as illustrated at operation 614, which can be associated with the designated portion of the context data. That is, the channel management component 118 can associate the designated portion of the context data with the new channel, as illustrated at operation 616. Additional details associated with generating a new channel are described below in FIG. 7. At least one example, the new channel can be associated with a different group of users than the DM communication. That is, the DM communication can be associated with a first group of users and the new channel can be associated with a second group of users, wherein a user is added to the first group of users (and thus, the second group of users includes the first group of users and the additional user) and/or a user is removed from the first group of users (and thus, the second group of users does not include the removed user).

After associating the designated portion of the context data with the new channel, the channel management component 118 can cause an indicator associated with the new channel to be presented via a user interface associated with the communication platform that is presented via the user computing device, as illustrated at operation 612.

Figure 7:
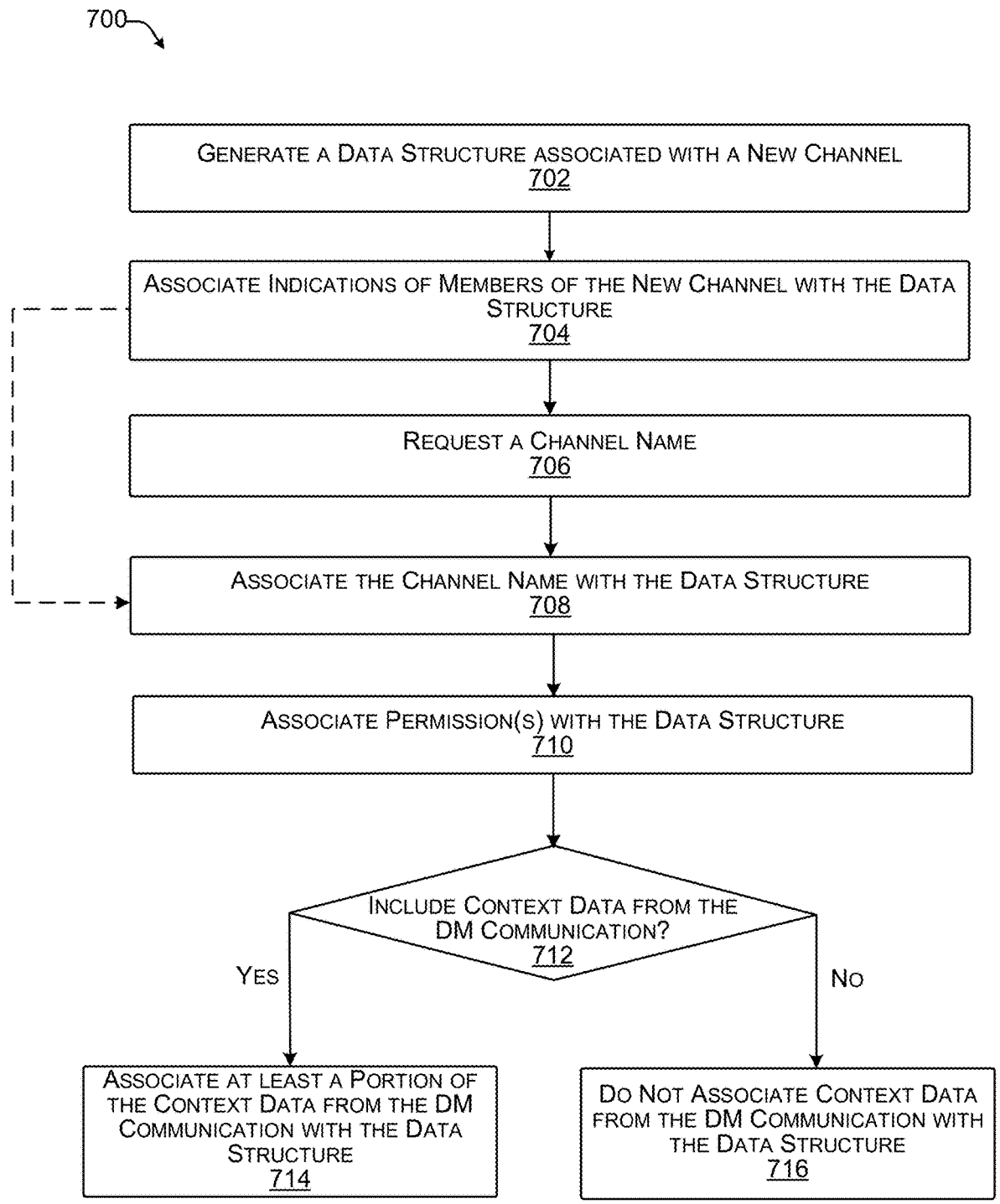
FIG. 7 illustrates an example process for generating a new channel, as described herein.

FIG. 7 illustrates an example process 700 for generating a new channel, as described herein. As described above, the datastore 122 associated with the server(s) 102 can store data associated with channels (e.g., channel data 130) and/or DM communications (e.g., DM data 132). In at least one example, individual channels and/or DM communications can be associated with individual data structures, wherein indications of member(s), permission(s), context data, and/or other data (e.g., name, details, etc.) are associated therewith.

At operation 702, the channel management component 118 can create a data structure associated with a new channel. In at least one example, the channel management component 118 can generate a data structure associated with a new channel. In some examples, the channel management component 118 can generate the data structure responsive to receiving input associated with modifying membership of a DM communication associated with two or more other users. That is, in some examples, the channel management component 118 can generate the data structure responsive to receiving input associated with adding an additional user to or removing a user from a DM communication.

At operation 704, the channel management component 118 can associate indications of members of the new channel with the data structure. In at least one example, input associated with adding a user to DM communication can be associated with an identifier of the additional user. In at least one example, the channel management component 118 can associate an indication of the additional user and indications of the two or more other users associated with the DM communication with the data structure. As such, the additional user and the two or more other users can be members of the new channel. In at least one example, input associated with removing a user from a DM communication can be associated with an identifier of the user to be removed. In at least one example, the channel management component 118 can associate indications of the two or more users associated with the DM communication that were not removed from membership of the DM communication with the data structure.

At operation 706, the channel management component 118 can request a channel name. In at least one example, the channel management component 118 can cause a user interface element to be presented via a user interface, such as the user interface 146, to prompt the user to provide a channel name to be associated with the channel. The user can provide the channel name via an input to the user interface element. The application 142 can send the input (or an indication associated therewith) to the channel management component 118, and the channel management component 118 can associate an indication of the channel name with the data structure, as illustrated at operation 708. In some examples, the process 700 can proceed from operation 704 to operation 708 without requesting a channel name from the user (as shown by the dashed line between operation 704 and operation 708). In such examples, the channel management component 118 can select a default channel name, analyze the context data to select a channel name, or the like.

At operation 710, the channel management component 118 can associate permission(s) with the data structure. In some examples, the channel management component 118 can associate default permission(s) with the new channel and thus can associate an indication of default permission(s) with the data structure. In some examples, the channel management component 118 can determine which of the users associated with the new channel is associated with the most restrictive permission(s). In such examples, the channel management component 118 can associate such permission(s) with the new channel and thus can associate an indication of such permission(s) with the data structure. In at least one example, the user that requested the modification to the membership of the DM communication can set the permission(s) associated with the new channel and/or the permission(s) associated with the user that requested the modification can be associated with the new channel. As such, the channel management component 118 can associate an indication of such permission(s) with the data structure.

At operation 712, the channel management component 118 can determine whether to include context data from the DM communication in the new channel. As described above, with reference to operation 406 of FIG. 4 and/or operation 506 of FIG. 5, the DM management component 116 can receive an input (or indication associated therewith) indicating (i) whether to include context data from the DM communication with a new communication channel and, in some examples, (ii) an amount of context data to include. If the user provides an input to include at least some context data, the DM management component 116 can provide an indication of such to the channel management component 118. In at least one example, the channel management component 118 can associate at least a portion of the context data from the DM communication with the data structure, as illustrated at operation 714.

As described above, in at least one example, the channel management component 118 can associate the designated amount of context data by duplicating the designated context data in the DM communication (e.g., the data structure associated therewith) and associating the duplicated context data with the data structure associated with the new channel, moving the designated context data from the DM communication (e.g., the data structure associated therewith) to the data structure associated with the new channel, or the like. That is, in some examples, the channel management component 118 can duplicate (e.g., copy) the designated context data and associate the duplicated context data with the new channel. In such an example, the duplicated context data can persist in the DM communication (and thus the DM communication can persist, too). In some examples, the channel management component 118 can move the designated context data from the DM communication to the new channel. In such examples, such context data may no longer exist in the DM communication and, if all context data is moved, the DM communication may no longer exist.

If the user provides an indication not to include any context data, the DM management component 116 can refrain from associating context data from the DM communication with the data structure, as illustrated at operation 716. In some examples, as described above, if a user does not request to include context data with the new channel, in some examples, the DM management component 116 can generate a new DM communication with the new membership instead of a new channel.

As described above with reference to FIGS. 1-7, techniques described herein are directed to streamlining modifications of membership to DM communications. As described above, techniques described herein enable users to add additional users to their conversations and/or remove users from their conversations via a streamlined, efficient process that minimizes interaction required of the users. Techniques described herein therefore provide for a faster "conversion" process (i.e., "converting" a DM communication to a new communication channel). That is, techniques described herein can streamline the modification of membership of DM communications as it pertains to adding or removing members from existing DM communications.

EXAMPLE CLAUSES

A. A method, implemented at least in part by one or more computing devices of a communication platform, comprising: receiving, in association with a direct message (DM) communication between two or more users of the communication platform, a first request to add an additional user to the DM communication; sending, to a user computing device associated with a user of the two or more users, a second request to (i) identify the additional user and (ii) designate whether to include context data associated with the DM communication in a new channel; and based at least in part on receiving (i) an identifier associated with the additional user and (ii) an indication to include at least a portion of the context data associated with the DM communication in the new channel, generating the new channel, wherein the two or more users and the additional user are members of the new channel, and the at least the portion of the context data is associated with the new channel.

B. The method of paragraph A, wherein the new channel is a private channel that is not discoverable to other users of the communication platform.

C. The method of paragraph A or B, wherein two or more members of the new channel are associated with two or more different organizations.

D. The method of any of paragraphs A-C, wherein the indication to include the context data further includes an indication of a date, wherein the portion of the context data comprises context data associated with the DM communication on or after the date.

E. The method of any of paragraphs A-D, wherein the indication to include the context data further includes an indication of a time, wherein the portion of the context data comprises context data associated with the DM communication on or after the time.

F. The method of any of paragraphs A-E, wherein the indication to include the context data further includes an indication of a period of time, wherein the portion of the context data comprises context data associated with the DM communication during the period of time.

G. The method of any of paragraphs A-F, wherein the indication to include the context data further includes an indication of a topic, wherein the portion of the context data comprises context data associated with the DM communication and the topic.

H. The method of any of paragraphs A-G, wherein the indication to include the context data further includes an indication of one or more messages, wherein the portion of the context data comprises the one or more messages.

I. The method of any of paragraphs A-H, wherein the indication to include the context data further includes an indication to include all of the context data, wherein the new channel is associated with all of the context data.

J. One or more computer-readable media comprising instructions that, when executed by one or more processors, cause the one or more processors to perform operations comprising: receiving, in association with a direct message (DM) communication between two or more users of a communication platform, a first request to add an additional user to the DM communication; sending, to a user computing device associated with a user of the two or more users, a second request to at least one of (i) identify the additional user and (ii) designate whether to include at least a portion of context data associated with the DM communication in a new channel; and based at least in part on receiving (i) an identifier associated with the additional user and (ii) an indication to include at least a portion of the context data in the new channel, generating the new channel, wherein the two or more users and the additional user are members of the new channel, and the at least the portion of the context data is associated with the new channel.

K. The one or more computer-readable media of paragraph J, wherein the new channel is a private channel that is not discoverable to other users of the communication platform.

L. The one or more computer-readable media of paragraph J or K, wherein the new channel is associated with one or more first permissions and the DM communication is associated with one or more second permissions that are different than the one or more first permissions.

M. The one or more computer-readable media of any of paragraphs J-L, wherein an indicator associated with the new channel is presented via a graphical user interface associated with the communication platform, in association with one or more other indicators associated with one or more other channels, and an indicator associated with the DM communication is presented via the graphical user interface, in association with one or more other indicators associated with one or more other DM communications.

N. The one or more computer-readable media of any of paragraphs J-M, wherein the additional user is associated with one or more first permissions that are different than one or more second permissions associated with at least one of the two or more users.

O. A system associated with a communication platform, wherein the system comprises: one or more processors; and one or more computer-readable media comprising instructions that, when executed by the one or more processors, cause the system to perform operations comprising: receiving, in association with a direct message (DM) communication associated with a first group of users of the communication platform and from a user computing device of a user of the first group of users, a first request to modify the first group of users; sending, to the user computing device, a second request to designate at least one of (i) whether to include context data associated with the DM communication in a new channel or (ii) an amount of context data to include in the new channel; and based at least in part on receiving an indication to include at least a portion of the context data associated with the DM communication in the new channel, generating the new channel, wherein the new channel is associated with a second group of users different than the first group of users, and the at least the portion of the context data is associated with the new channel.

P. The system of paragraph O, wherein the new channel is a private channel that is not discoverable to other users of the communication platform.

Q. The system of paragraph O or P, wherein the new channel is shared between two different organizations.

R. The system of any of paragraphs O-Q, wherein generating the new channel comprises: creating a data structure associated with the new channel; associating indications of the second group of users with the data structure associated with the new channel; associating a channel name with the data structure associated with the new channel; and associating the portion of the context data associated with the DM communication with the data structure associated with the new channel.

S. The system of paragraph R, wherein the portion of the context data is moved from a data structure associated with the DM communication to the data structure associated with the new channel.

T. The system of any of paragraphs O-S, wherein prior to generating the new channel, sending a third request to the user computing device, wherein the third request prompts the user to name the new channel, the operations further comprising: receiving, responsive to sending the third request, a channel name for the new channel; associating the channel name with the new channel; and causing an indicator associated with the new channel to be presented in a region of a graphical user interface associated with one or more other channels, wherein the indicator includes the channel name.

While the example clauses described above are described with respect to one particular implementation, it should be understood that, in the context of this document, the content of the example clauses can also be implemented via a method, device, system, a computer-readable medium, and/or another implementation. Additionally, any of paragraphs A-T may be implemented alone or in combination with any other one or more of the paragraphs A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, comprising:

receiving, in association with a direct message (DM) communication between first members of the DM communication, a first request to generate a new channel associated with the DM communication, wherein the first members include a first user and a second user of the communication platform, and the DM communication is a private communication that is not discoverable to other users of the communication platform, wherein a first permission setting for membership modification is associated with the DM communication and the first permission setting includes permission for at least one of the first members to create the new channel;

sending, to a client associated with the first user, a second request to (i) identify a third user and (ii) designate whether to include context data associated with the DM communication in the new channel;

based at least in part on receiving (i) an identifier associated with the third user and (ii) an indication to include at least a portion of the context data associated with the DM communication in the new channel, generating the new channel, wherein:
  the first members and the third user are second members of the new channel,
  the new channel is a private channel that is not discoverable to the other users of the communication platform,
  two or more of the second members of the new channel are associated with two or more different organizations,
  the at least the portion of the context data associated with the DM communication between the first members is associated with the new channel,
  a second permission setting for membership modification is associated with the new channel, and
  the second permission setting includes permission for the first members and the third user to perform membership modification for the new channel; and displaying, via at least one client associated with at least one of the second members and in association with the new channel, an interface element usable to invite one or more other users not previously associated with the DM communication to communicate via the new channel.

2. The method of claim 1, wherein the indication to include the at least the portion of the context data further includes a second indication of a date, wherein the portion of the context data was previously associated with the DM communication on or after the date.

3. The method of claim 1, wherein the indication to include the at least the portion of the context data further includes a second indication of a time, wherein the portion of the context data was previously associated with the DM communication on or after the time.

4. The method of claim 1, wherein the indication to include the at least the portion of the context data further includes a second indication of a period of time, wherein the portion of the context data was previously associated with the DM communication during the period of time.

5. The method of claim 1, wherein the indication to include the at least the portion of the context data further includes a second indication of a topic, wherein the portion of the context data is associated with the topic.

6. The method of claim 1, wherein the indication to include the at least the portion of the context data further includes a second indication of one or more messages, wherein the portion of the context data comprises the one or more messages.

7. The method of claim 1, wherein the indication to include the at least the portion of the context data further includes a second indication to include all of the context data, wherein the new channel is associated with all of the context data.

8. One or more non-transitory computer-readable media comprising instructions that, when executed by one or more processors, cause the one or more processors to perform operations comprising:
  receiving, in association with a direct message (DM) communication between first members of the DM communication, a first request to generate a new channel associated with the DM communication, wherein the first members include a first user and a second user of a communication platform, and the DM communication is a private communication that is not discoverable to other users of the communication platform, wherein a first permission setting is associated with the DM communication and the first permission setting includes permission for at least one of the first members to create the new channel;
  sending, to a client associated with the first user, a second request to at least one of (i) identify a third user and (ii) designate whether to include at least a portion of context data associated with the DM communication in the new channel;
  based at least in part on receiving (i) an identifier associated with the third user and (ii) an indication to include the at least the portion of the context data in the new channel, generating the new channel, wherein:
    the first members and the third user are second members of the new channel,
    two or more of the second members of the new channel are associated with two or more different organizations,
    the new channel is a private channel that is not discoverable to the other users of the communication platform,
    the at least the portion of the context data associated with the DM communication between the first members is associated with the new channel,
    a second permission setting is associated with the new channel and the second permission setting includes permission for the first members, and
    the third user to perform membership modification for the new channel; and
  displaying, via at least one client associated with at least one of the second members and in association with the new channel, an interface element usable to invite one or more other users not previously associated with the DM communication to communicate via the new channel.

9. The one or more non-transitory computer-readable media of claim 8, wherein the new channel is associated with one or more first permissions and the DM communication is associated with one or more second permissions that are different than the one or more first permissions.

10. The one or more non-transitory computer-readable media of claim 8, wherein a first indicator associated with the new channel is presented via a graphical user interface associated with the communication platform, in association with one or more other first indicators associated with one or more other channels, and a second indicator associated with the DM communication is presented via the graphical user interface, in association with one or more other second indicators associated with one or more other DM communications.

11. The one or more non-transitory computer-readable media of claim 8, wherein the third user is associated with one or more first permissions that are different than one or more second permissions associated with at least one of the first user or the second user.

12. A system associated with a communication platform, wherein the system comprises:
   one or more processors; and
   one or more non-transitory computer-readable media comprising instructions that, when executed by the one or more processors, cause the system to perform operations comprising:
   receiving, in association with a direct message (DM) communication associated with first members of the DM communication, wherein the first members include a first user and a second user of the communication platform, and from a client of the first user, a first request to generate a new channel associated with the DM communication, wherein the DM communication is a private communication that is not discoverable to other users of the communication platform, wherein a first permission setting for membership modification is associated with the DM communication and the first permission setting includes permission for the first user to create the new channel;
   sending, to the client, a second request to designate at least one of (i) whether to include context data associated with the DM communication in the new channel or (ii) an amount of the context data to include in the new channel;
   based at least in part on receiving an indication to include at least a portion of the context data associated with the DM communication in the new channel, generating the new channel, wherein:
      the new channel is a private channel that is not discoverable to the other users of the communication platform,
      the new channel is shared between two or more different organizations,
      the at least the portion of the context data associated with the DM communication between the first user and the second user is associated with the new channel,
      a second permission setting for membership modification is associated with the new channel and the second permission setting includes permission for the first user, and
      the second user to perform membership modification for the new channel; and
   in response to generating the new channel, displaying an interface element usable to invite a third user not previously associated with the DM communication to communicate via the new channel.

13. The system of claim 12, wherein generating the new channel comprises:
   creating a first data structure associated with the new channel;
   associating indications of the first user and the second user with the first data structure associated with the new channel;
   associating a channel name with the first data structure associated with the new channel; and
   associating the at least the portion of the context data associated with the DM communication with the first data structure associated with the new channel, wherein the at least the portion of the context data is moved from a second data structure associated with the DM communication to the first data structure associated with the new channel.

14. The system of claim 12, wherein prior to generating the new channel, sending a third request to the client, wherein the third request prompts the first user to name the new channel, the operations further comprising:
   receiving, responsive to sending the third request, a channel name for the new channel;
   associating the channel name with the new channel; and
   causing an indicator associated with the new channel to be presented in a region of a graphical user interface associated with one or more other channels, wherein the indicator includes the channel name.

15. The method of claim 1, wherein:
   the first permission setting prevents the first user and the second user from inviting the third user to communicate via the DM communication; and
   the second permission setting permits at least one of the first user or the second user to invite the third user to communicate via the new channel.

16. The one or more non-transitory computer-readable media of claim 8, wherein the indication to include the at least the portion of the context data further includes a second indication of one or more messages, wherein the at least the portion of the context data comprises the one or more messages.

17. The system of claim 12, wherein the indication to include the at least the portion of the context data further includes a second indication of one or more messages, wherein the at least the portion of the context data comprises the one or more messages.

18. The system of claim 12, wherein the third user is associated with one or more first permissions that are different than one or more second permissions associated with the first user and the second user.

* * * * *